(12) United States Patent
Khayrallah et al.

(10) Patent No.: US 7,469,024 B2
(45) Date of Patent: Dec. 23, 2008

(54) METHOD AND APPARATUS FOR FINGER PLACEMENT IN RAKE RECEIVER

(75) Inventors: Ali S. Khayrallah, Cary, NC (US); Carmela Cozzo, Cary, NC (US); Gregory E. Bottomley, Cary, NC (US)

(73) Assignee: Telefonaktiebolaget LM Ericsson (publ), Stockholm (SE)

(*) Notice: Subject to any disclaimer, the term of this patent is extended or adjusted under 35 U.S.C. 154(b) by 1018 days.

(21) Appl. No.: 10/653,679

(22) Filed: Sep. 2, 2003

(65) Prior Publication Data
US 2005/0047485 A1    Mar. 3, 2005

(51) Int. Cl.
H04B 7/10    (2006.01)
(52) U.S. Cl. .................... 375/347; 375/267
(58) Field of Classification Search ........... 375/347, 375/267
See application file for complete search history.

(56) References Cited

U.S. PATENT DOCUMENTS

| | | | |
|---|---|---|---|
| 6,839,378 | B1 | 1/2005 | Sourour et al. |
| 7,039,097 | B2* | 5/2006 | Terao ............. 375/148 |
| 2004/0072553 | A1* | 4/2004 | Wang et al. ......... 455/334 |

FOREIGN PATENT DOCUMENTS

| | | |
|---|---|---|
| EP | 0932263 | 1/1999 |
| JP | 11-261528 | 9/1999 |
| WO | 02/29994 | 4/2002 |

OTHER PUBLICATIONS

G.E. Bottomley, E. Sourour, R. Ramesh, and S. Chennakeshu; "Optimizing the Performance of Limited Complexity RAKE Receivers"; in Proc. 48th IEEE Veh. Technol. Conf., Ottawa, Canada, May 18-21, 1998; pp. 968-972.
R. Price and P.E. Green; "A Communication Technique for Multipath Channels"; Proceedings of the IRE; 1958; pp. 555-570.
S. Fukumoto, K. Okawa, K. Higuchi, M. Sawahashi and F. Adachi; "Path Search Performance and its Parameter Optimization of Pilot Symbol-Assisted Coherent Rake Receiver for WCDMA Mobile Radio"; IEICE Trans. Comm., vol. E83-A, No. No. 11; Nov. 2000; pp. 2110-2119.

(Continued)

*Primary Examiner*—Kevin Y Kim
(74) *Attorney, Agent, or Firm*—Coats & Bennett, P.L.L.C.

(57) ABSTRACT

A receiver based on a RAKE receiver architecture includes a logic circuit configured to assign one or more RAKE fingers to a finger placement grid that is independent from a searcher delay grid used by the receiver's searcher in generating multipath delay profiles for received signals. The logic circuit may use the multipath delay profile to "tune" the finger placement grid relative to the searcher delay grid but the delay resolution of the finger placement grid is independent of the searcher delay grid. This independence permits, for example, setting the finger placement grid to a delay resolution based on a Nyquist criterion independently from the delay resolution used by the searcher. The receiver may use two or more finger placement grids, may operate in a mixed mode where fingers are assigned on- and off-grid, and may operate selectively in grid or non-grid modes.

91 Claims, 11 Drawing Sheets

OTHER PUBLICATIONS

A.P. Hulbert; "Comprehensive RAKE—a Novel and Practical Receiver Architecture Offering Improved Performance"; Proc. IEEE ISSSTA, Oulu, Finland; Jul. 4-6, 1994.

A. Baier, U. Fiebig, W. Granzow, W. Koch, P. Teder and J. Thielecke; "Design Study for a CDMA-based Third Generation Mobile Radio System"; IEEE JSAC, vol. 12, No. 4; May 1994; pp. 733-743.

P. Sehier and P. Brelivet; "Performance Evaluation of an Oversamples RAKE Receiver"; Proc. IEEE MILCOM; vol. 2; 1994; pp. 410-414.

G.L. Turin; "Introduction to Antimultipath Techniques and their Application to Urban Digital Radio"; Proc. IEEE, vol. 68; Mar. 1980; pp. 328-353.

S. Abeta, S. Sampei, and N. Morinaga; "DS/CDMA Coherent Detection System with a Suppressed Pilot Channel"; Proc. IEEE Global Telecommun. Conf. (Globecom), San Francisco, CA; Nov. 28-Dec. 2, 1994; pp. 1622-1626.

E. Del Re, R. Fantacci, and P. Giannoccaro; "Practical RAKE Receiver Architecture for the Downlink Communications in a DS-CDMA Mobile System"; IEEE Proc.-Commun., vol. 145, No. 4; Aug. 1998; pp. 277-282.

U. Fawer, K.K. Dhar, and A.L. Welti; "A Multiprocessor Approach for Implementing a Time-Diversity Spread Spectrum Receiver"; Proc. Intl. Zurich Seminar on Digital Comm.; 1990; pp. 173-180.

U. Grob, A.L. Welti, E. Zollinger, R. Kung, and H. Kaufmann; "Microcellular Direct-Sequence Spread-Spectrum Radio System Using N-Path RAKE Receiver"; IEEE J. Sel. Areas Commun., vol. ; Jun. 1990; pp. 772-790.

H. Hamada, M. Nakamura, T. Kubo, M. Minowa, and Y. Oishi; "Performance Evaluation of the Path Search Process for the W-CDMA System"; Proc. IEEE Veh. Technol. Conf., Houston, TX; May 16-19, 1999; pp. 980-984.

K. Higuchi, H. Andoh, M. Sawahashi, and F. Adachi; "Experimental Evaluation of Combined Effect of Coherent RAKE Combining and SIR-Based Fast Transmit Power Control for Reverse Link of DS-CDMA Mobile Radio"; IEEE J. Sel. Areas Commun.,vol. 18; Aug. 2000; pp. 1526-1535.

A. Huang, M. Hall and I. Hartimo; "Multipath Channel Estimation for WCDMA Uplink"; Proc. IEEE Veh. Technol. Conf., Amsterdam, Netherlands; vol. 2; Sep. 19-22, 1999; pp. 141-145.

K.J. Kim, S.Y. Kwon, E.K. Hong, and K.C. Whang; "Effect of Tap Spacing on the Performance of Direct-Sequence Spread-Spectrum RAKE Receiver"; IEEE Trans. Commun., vol. 48; Jun. 2000; pp. 1029-1036.

J.T.E. McDonnell, A.H. Kemp, J.P. Aldis, T.A. Wilkinson, and S.K. Barton; "Simulated BER Performance of, and Initial Hardware Results from, the Uplink in the U.K. LINK-CDMA Testbed"; Proc. IEEE Intl. Symp. Spread Spectrum Techn. And Appl.; 1996; pp. 229-233.

Hafez Hadinejad-Mahrtam, Harald Elders-Boll, and Gholamreza Alirezaei; "Performance Evaluation of Advanced Receivers for WCDMA Downlink Detection"; 5 pgs.

Nabil R. Yousef, and Ali H. Sayed; "A New Combined Architecture for CDMA Location Searches and RAKE Receivers"; Proc. International Symposium on Circuits and Systems (ISCAS); Geneva, Switzerland; May 2000; 5 pgs.

S. Sun, H. Sugimoto, L.K. Rasmussen, and T.J. Lim; "A Multipath Searcher with the Hybrid CDMA Interference Canceller"; 0-7803-5718-3/00/I0.00 2000 IEEE; pp. 931-935.

Hwang, Bong-Jun; "Performance Analysis of Multipath Searcher in WCDMA System"; UMTS System Research Lab, LG Electronics Inc.; 8 pgs.

Co-pending U.S. Appl. No. 11/566,256, filed Dec. 4, 2006.

Simon, V. et al. "A Rake Finger Grid for Asynchronous DS-CDMA Systems using LMMSE Tap Weight Estimation." 57th IEEE Semi-annual Vehicular Technology Conference (VTC 2003). vol. 4, Apr. 2003, pp. 2691-2695. XP-002313210.

Vejlgaard, B.N. et al. "Grouped Rake Finger Management Principle for Wideband CDMA." 51st IEEE Vehicular Technology Conference (VTC 2000-Spring). vol. 1, May 2000, pp. 87-91. XP-00970585.

* cited by examiner

METHOD AND APPARATUS FOR FINGER PLACEMENT IN RAKE RECEIVER

BACKGROUND OF THE INVENTION

The present invention generally relates to RAKE receivers and particularly relates to the placement of RAKE fingers in a RAKE receiver.

RAKE receivers represent a well-known approach to multipath reception, particularly in Direct Sequence Code Division Multiple Access (DS-CDMA) wireless communication systems. With multipath, a transmitted signal follows multiple propagation paths and the intended receiver thus receives a "composite" signal that may include multiple "versions" of the transmitted signal, with each version generally suffering from different path delay, phase, and attenuation effects. The different versions of the received signal, which may be referred to as "signal images," thus arrive at the receiver slightly ahead of or behind the other images. The maximum delay spread between signal images, i.e., the "dispersion," depends on, among other things, the signal bandwidth and the differing characteristics of the signal propagation paths.

Normally, a RAKE receiver includes a plurality of "fingers," wherein each finger operates as a despreading circuit, i.e., a correlator that is configured to despread a signal image at a configurable relative delay. Nominally, the RAKE receiver aligns its available RAKE fingers to the strongest signal images, such that each selected signal image is despread and then combined in subsequent processing. Combining the multiple signal images in this manner generally provides improved signal to noise ratios at the receiver.

Supporting these operations, the RAKE receiver includes, or otherwise cooperates with, a searcher that identifies signal peaks in the received signal across a defined search window. Nominally, each signal peak corresponds to a different signal image, but because of "smearing" between closely spaced signal images, one or more of the delay peaks may actually represent multiple signal images. The searcher identifies signal peaks using a searcher delay grid, and the RAKE receiver time aligns one or more of its fingers to those searcher-identified delay peaks.

SUMMARY OF THE INVENTION

The present invention comprises a method and apparatus to "place" fingers in a RAKE receiver using a delay resolution that is independent from the delay resolution used to generate a multipath delay profile for the received signal. In an exemplary embodiment, a searcher generates a multipath delay profile for the received signal as a set of measurements taken across a defined search window at uniformly spaced searcher delay grid points, and the RAKE receiver places one or more of its RAKE fingers using a finger placement grid that is independent of the searcher delay grid. The receiver may or may not tune the finger placement grid with regard to the multipath delay profile. Further, the receiver may operate with two or more finger placement grids, each of which may or may not be tuned relative to the multipath delay profile. The receiver also may operate in a mixed mode wherein one or more fingers are placed on a finger placement grid and one or more fingers are not placed on a finger placement grid. Such mixed mode operation may be based on the characteristics of the multipath delay profile, for example.

An exemplary receiver comprises a RAKE receiver that includes a logic circuit operating as a finger placement processor. The placement processor, which may be implemented in hardware, software, or some combination thereof, determines finger assignments for one or more finger placement grids based on, for example, evaluating grid point quality or cluster quality. The placement processor may interpolate between measurement sample points in the multipath delay profile to determine the point qualities of finger placement grid points that do not coincide with searcher measurements.

An exemplary receiver also may operate in selective placement modes. For example, the receiver may operate with a first finger placement strategy in a first mode and may operate with a second finger placement strategy in a second mode. In an exemplary embodiment, the receiver changes mode based on, for example, the multipath delay profile characteristics. In one embodiment, the first mode comprises the finger placement grid mode, and the second embodiment comprises a non-grid mode where finger placement grids are not used to align fingers relative to the received signal. For example, in the second mode, the receiver simply may align one or more of its RAKE fingers to the strongest signal peaks within the multipath delay profile.

Those skilled in the art should appreciate that the present invention is not limited to these broadly described embodiments. Indeed, the many additional features and advantages of the present invention will become apparent upon reading the following detailed description in conjunction with viewing the various exemplary drawings.

DETAILED DESCRIPTION OF THE INVENTION

Figure 1:
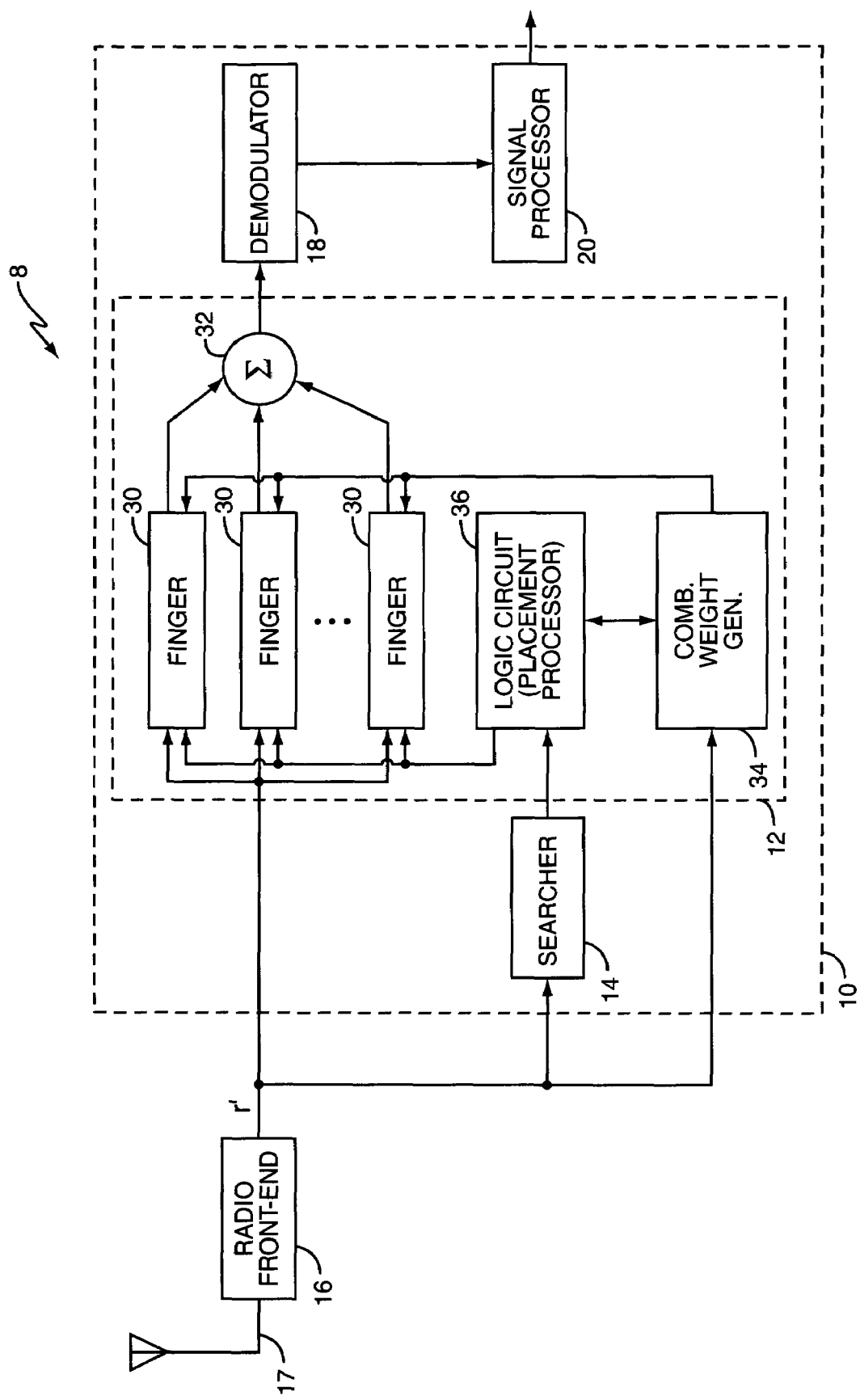
FIG. 1 is a diagram of a wireless communication device that includes a receiver according to an exemplary embodiment of the present invention.

FIG. 1 illustrates an exemplary wireless communication device 8 that comprises an exemplary receiver 10 according to one embodiment of the present invention. Particularly, receiver 10 comprises a RAKE receiver 12 that includes or otherwise is associated with a searcher 14 and a radio front-end 16. Radio front-end 16 provides RAKE receiver 12 with a received composite signal (r') that RAKE receiver 12 processes to provide a demodulator 18 with a despread received signal. For QPSK modulation, the demodulator 18 may simply take the real and imaginary parts of the RAKE output. Additional operations may be involved for higher order modulation. In turn, demodulator 18 provides a signal processor 20 with a demodulated signal from which signal processor 20 recovers the transmitted information signal. The signal processor 20 may apply convolutional or turbo decoding for error-correction.

While the illustrated receiver 10 finds exemplary application in DS-CDMA systems such as IS-95B, IS-2000, or WCDMA systems, those skilled in the art will appreciate that its use is not limited to those particular types of systems. Indeed, the application, features, and arrangement of the receiver 10 may be varied without departing from the scope of the present invention.

Figure 2:
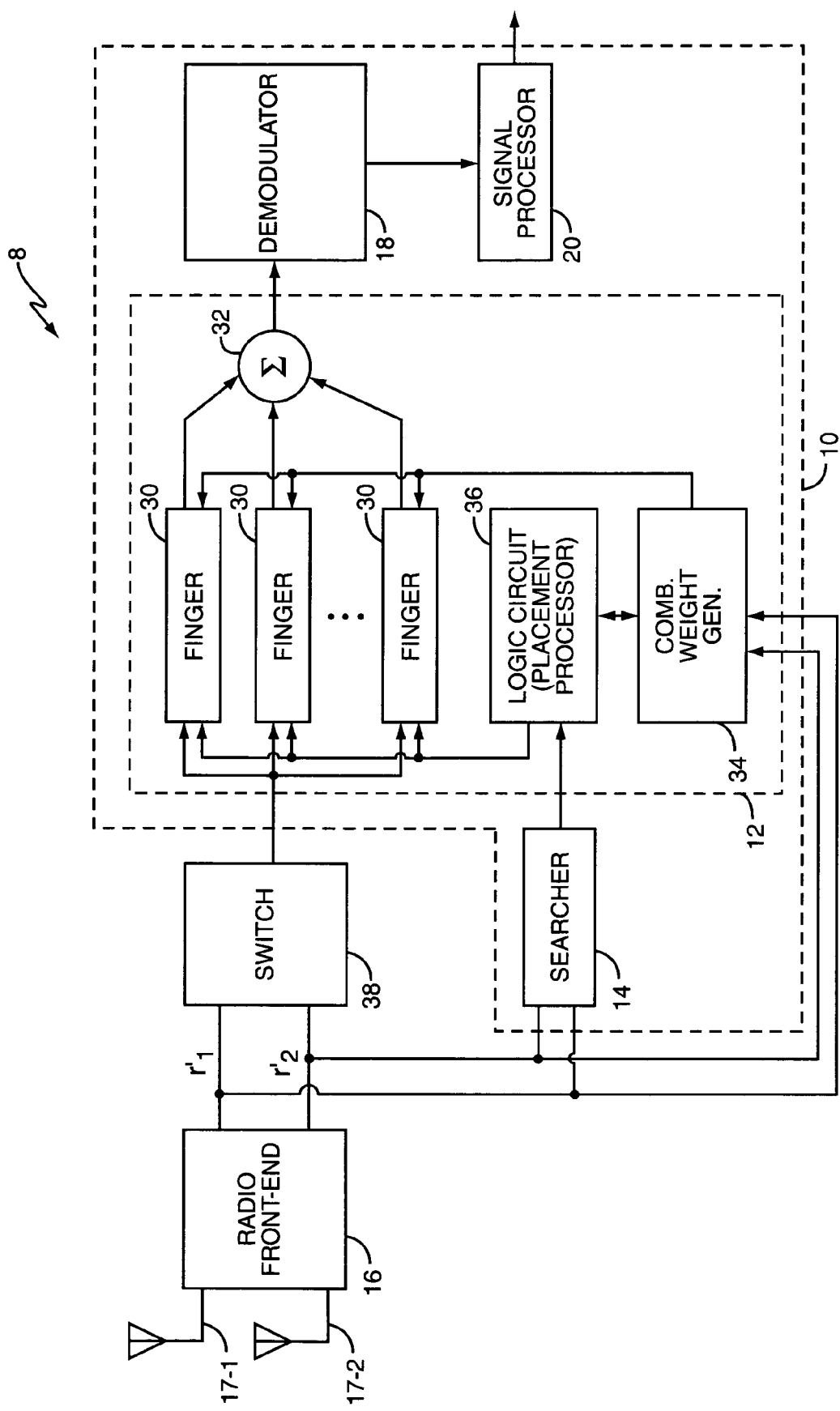
FIG. 2 is a diagram of another exemplary receiver embodiment.

For example, FIG. 2 illustrates a device configuration that includes two receive antennas (17-1 and 17-2) for reception diversity. With this configuration, the radio front-end may be configured to process the two receive antenna signals separately to generate separate composite received signals ($r'_1$ and $r'_2$), which may be switched using switch 38 to fingers 30 within RAKE receiver 12. Indeed, RAKE receiver 12 may be implemented such that it applies its finger placement and despreading operations to a combination of the two received composite signals, or such that it performs such operations independently for each of the received composite signals. These variations are described in more detail later herein.

Figure 3:
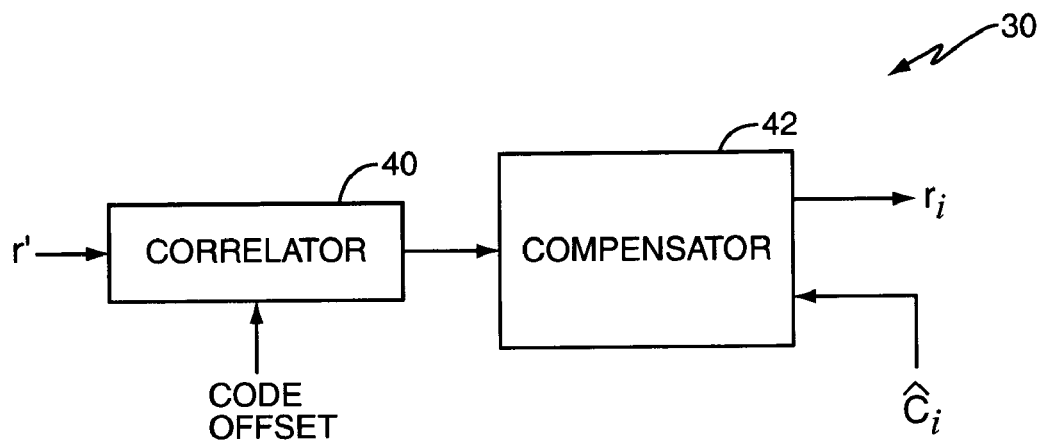
FIG. 3 is a diagram of an exemplary RAKE finger.

Similarly, certain aspects of RAKE receiver 12 are discussed in more detail later herein. However, FIG. 3 illustrates an exemplary configuration for each individual finger 30, which comprises a correlator 40 and a channel compensator 42, which may use channel estimation information from the earlier illustrated combining weight generator 34.

Regardless, correlator 40 provides an exemplary mechanism for "aligning" finger 30 with a particular one of the signal images in the received composite signal. That is, controlling the offset of the PN code provided to correlator 40 controls the effective time delay of finger 30 relative to the incoming received signal. Note, however, that the present invention contemplates alternative finger placement mechanisms, including the use of configurable upstream delay buffers to provide the desired delay alignment.

In an exemplary embodiment of RAKE receiver 12, a logic circuit ("placement processor") 36 determines delay assignments for one or more fingers 30 of RAKE receiver 12 based on a finger placement grid comprising a plurality of spaced apart grid points that span at least a portion of the multipath delay profile, and wherein the spacing (resolution) of the finger placement grid is independent of the spacing between measurement points in the multipath delay profile. That is, the searcher 14 generates the multipath delay profile by developing a set of measurement values over a defined search window, with each measurement value corresponding to one in a set of spaced apart measurement points that span the search window. Thus, these measurement points represent a searcher delay grid that defines the delay resolution at which searcher 14 samples the received signal to generate the multipath delay profile. Therefore, the term "independent" connotes that the spacing of the finger placement grid is not set from the searcher grid used to generate the multipath delay profile, although both grids may be multiples of the same base resolution.

For example, an exemplary searcher 14 may be configured to perform a series of correlations on the incoming received signal across a series of uniformly spaced delay points (measurement points) within a defined search window. Thus, the searcher 14 correlates the received signal with the appropriate despreading code at each of a plurality of uniformly spaced delay points. These correlations may be squared, accumulated and averaged, or processed in some other manner, for each of the searcher's uniformly spaced delay positions to generate a Power/Delay Profile (PDP) for the received signal, which comprises a set of measurement values from which the delay peaks corresponding to the different signal images can be at least roughly identified.

Such searcher grid points might be defined using, for example, half-chip spacing or chip spacing. Here, the term "chip" refers to the duration of a single spreading chip used by the spread spectrum transmitter(s) originating the received signal. It should be understood that something other than chip timing may be used as a reference for the delay resolution.

Figure 4:
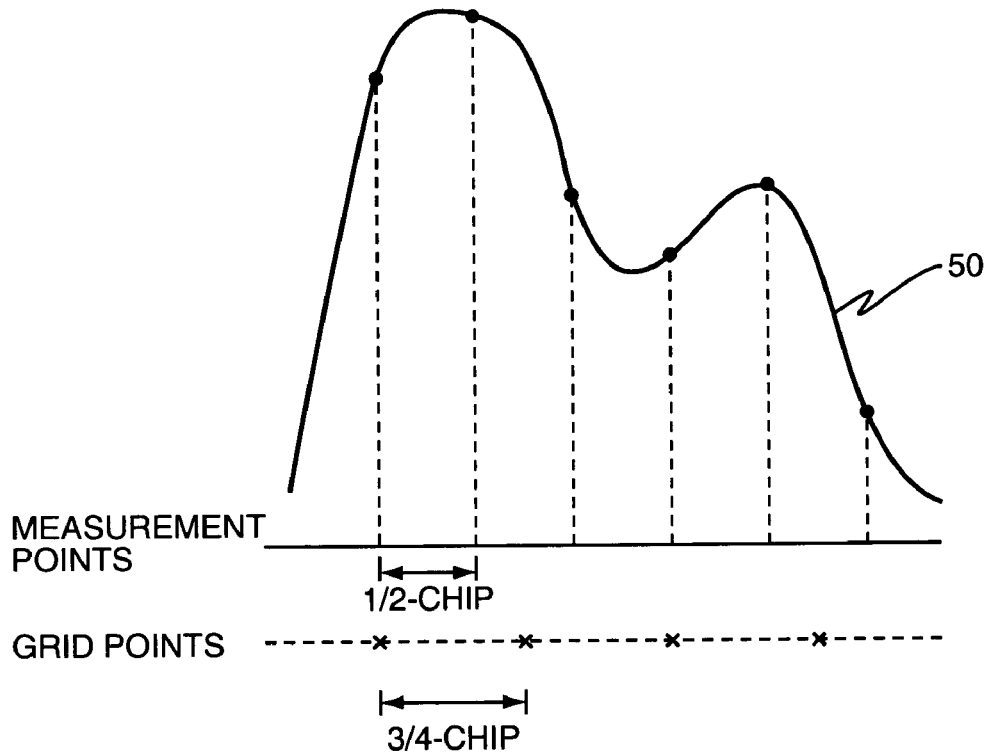
FIG. 4 is a diagram of an exemplary searcher delay grid and an exemplary, independent finger placement grid.

When it is explained herein that the RAKE receiver 12 uses one or more finger placement grids that are independent from the searcher delay grid, it should be understood that RAKE receiver 12 in fact may tune its finger placement grid(s) in some embodiments such that one or more finger placement grid points coincide with searcher delay grid points but that the underlying spacing used to define the delay interval between finger placement grid points is defined, or otherwise configured, independently from that used for the searcher delay grid. That is, the searcher 14 may use a first delay resolution for characterizing the delay profile of the received signal, and the RAKE receiver 12 may use a second delay resolution for its one or more finger placement grids, wherein that second delay resolution is defined independently from the first delay resolution. FIG. 4 offers an exemplary illustration of this independence.

In an exemplary method, the placement processor 36 uses knowledge gained from the multipath delay profile developed by the searcher 14 to align its finger placement grid(s) and/or to make finger assignment to particular finger placement grid points. As noted, the multipath delay profile may comprise a set of PDP measurements which reflect the relative received signal powers taken across a discrete set of delay points within the search window used by the searcher 14.

More generally, an exemplary multipath delay profile comprises a set of measurement values corresponding to a plurality of measurement points—searcher delay grid points—that span a defined search window in time relative to the incoming received signal. Thus, each measurement value corresponds to a particular measurement point that, in turn, relates to a relative signal delay. The measurement values may be obtained, for example, by averaging one or more signal correlations for each measurement point, such that measurement or signal peaks within the multipath delay profile correspond to measurement points having delays that match or are close to one or more signal image delays. The strongest measurement values most closely align with the actual delays of one or more signal images in the received signal. As noted, two or more signal images may be very closely spaced in terms of receiver arrival time and thus may appear as a widened measurement peak (i.e., a cluster) within the multipath delay profile.

Figure 5:
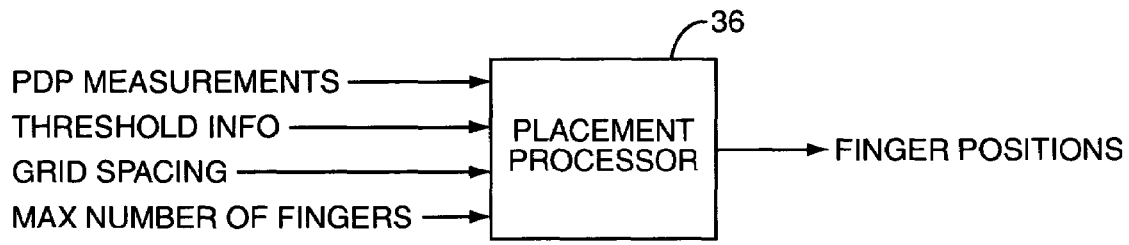
FIG. 5 is a diagram of an exemplary logic circuit to perform finger placement operations in accordance with one or more embodiments of the present invention.

Thus, according to FIG. 5, an exemplary placement processor 36 receives PDP measurements, "thresholding" information, grid spacing information, and, optionally, the maximum number of fingers 30 to be assigned in sets or subsets as desired. With this information, the placement processor 36 outputs finger placement positions, which represent the assignments of individual RAKE fingers 30 to particular grid positions within one or more defined finger placement grids. Referring back to FIG. 3, for example, the placement processor 36 thus may output the appropriately offset PN codes for assigned ones of the individual fingers 30 comprising RAKE receiver 12.

In an exemplary embodiment, RAKE receiver 12 uses one finger placement grid comprising a plurality of uniformly spaced delay positions spanning all or part of the same time window over which the PDP was developed. If the finger placement grid has a different resolution than the searcher delay grid, then its grid points generally will not match the searcher delay grid points, although the two grids may have matching pairs of points depending on the mathematical relationship between the measurement point spacing in the multipath delay profile and the grid point spacing of the finger placement grid.

In any case, RAKE receiver 12 might simply evaluate each of its finger placement grid points by examining grid points that are close to a measurement peak of the PDP. Indeed, RAKE receiver 12 may determine a grid point quality for each of its finger placement grid points based on one or more PDP measurement values. Broadly, RAKE receiver 12 would consider one finger placement grid point as being "better" than another if it had a larger quality value. It should be understood that RAKE receiver 12 may nuance its point quality evaluations to ensure that the "better" point actually is selected.

In an exemplary variation, RAKE receiver 12 may identify "candidate" grid positions by comparing PDP measurement values to a defined threshold, such as might be provided by the aforementioned thresholding information. With this approach, RAKE receiver 12 enhances processing efficiency by evaluating the quality of only those finger placement grid points that are close to sufficiently large measurement values in the multipath delay profile. Depending on the number of fingers to be assigned by the receiver 10, some number of these candidate positions will be assigned fingers 30 and the outputs from those assigned fingers 30 will be RAKE combined to form the output signal for further processing by demodulator 18 and signal processor 20.

Figure 6:
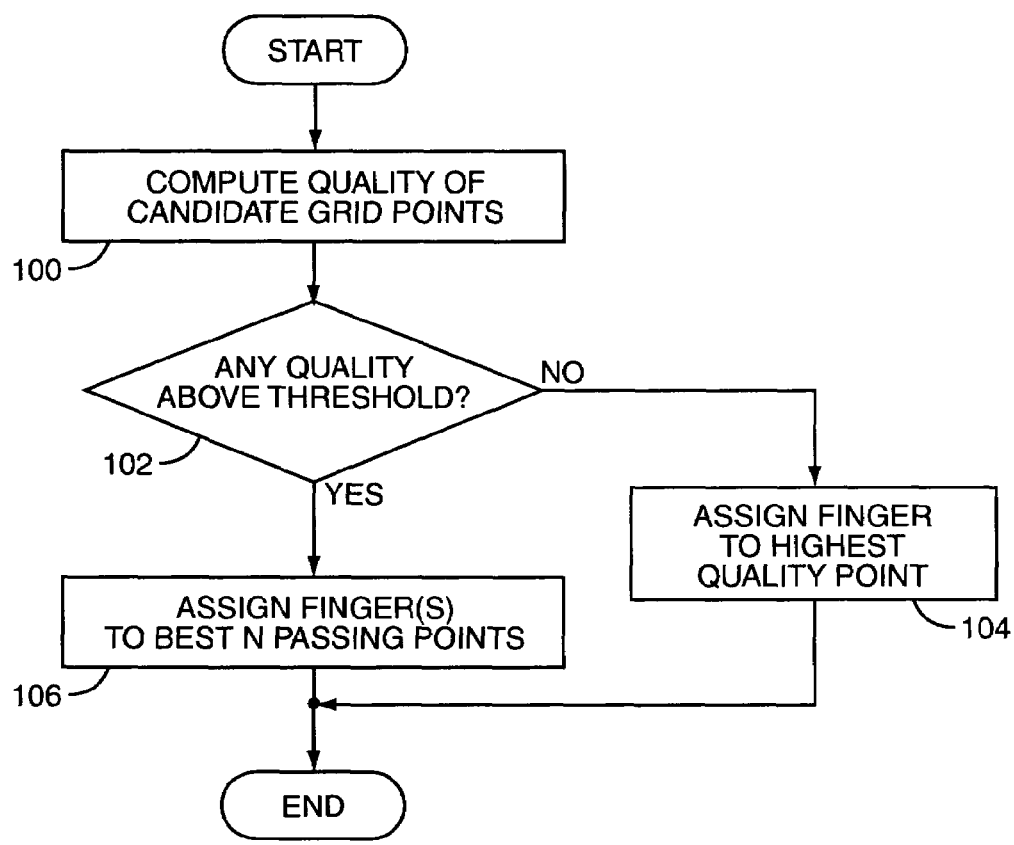
FIG. 6 is a diagram of exemplary logic for one embodiment of the present invention.

The present invention permits broad flexibility with regard to defining finger placement grids, and further with regard to making specific finger assignments to one or more grid positions within those placement grids. FIG. 6 illustrates a first exemplary approach that addresses the realistic possibility that the number of available RAKE fingers 30 may be much smaller than the number of possible (suitable) finger placement grid position assignments. With this approach, qualities are assigned to candidate grid points based on the PDP measurements. These quality values are "thresholded" by comparing them individually to a defined energy or power threshold representing a level below which the gird point is considered as corresponding to a signal delay that is unsuitable for finger assignment.

Processing begins by computing quality values for candidate finger positions that correspond to an evenly spaced grid of delays (Step 100). One or more exemplary representations of point quality are defined later herein. Placement processor 36 then determines whether any quality value is above the defined threshold (Step 102). If not, the exemplary method chooses the highest PDP position (Step 104) and makes finger assignments accordingly. However, if one or more quality values are above the threshold, placement processor 36 places fingers on the corresponding grid points (Step 106). If there are more points that pass the threshold than there are fingers available (N), then placement processor 36 chooses the best "N" positions from among them.

Figure 7:
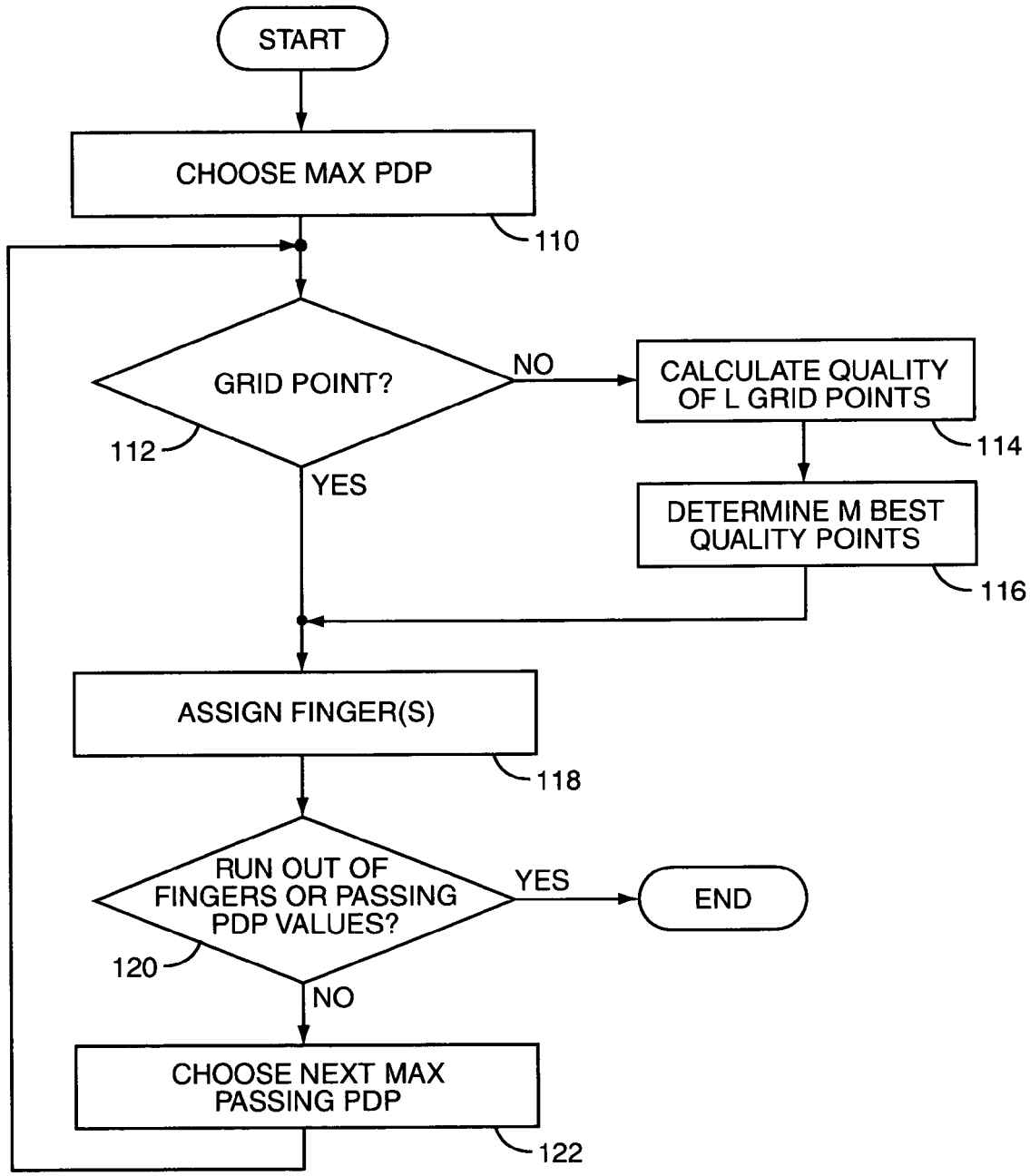
FIG. 7 is a diagram of exemplary logic for another embodiment of the present invention.

FIG. 7 illustrates a second exemplary embodiment of grid placement methodology, wherein placement processor 36 begins processing with the largest passing PDP measurement, i.e., the greatest of the PDP measurements that are above the measurement threshold. Thus, processing begins with placement processor 36 choosing the maximum PDP measurement (Step 110) and determining whether or not that measurement corresponds to a grid point within the defined finger placement grid (Step 112). If so, this point is assigned a RAKE finger 30 (Step 118) and additional finger assignments to the next closest grid points may be made. If not, placement processor 36 calculates the quality of the closest "L" grid points for that maximum PDP value. From these L grid points, placement processor 36 then determines the "M" best (highest) quality points (Step 116), and then makes finger placement assignments accordingly (Step 118). Steps 114 and 116 may be simplified by simply selecting the L closest grid points for assignment.

If placement processor 36 runs out of available fingers 30 or runs out of passing PDP values (Step 120), processing ends, but otherwise the process repeats with the next maximum passing PDP value (Step 122). Note, too, that grid points that have RAKE fingers 30 assigned to them are not considered further.

Note that with either the first or second finger placement method embodiments, it is not necessary for the placement processor 36 to "tune" the finger placement grid (or grids) that it uses in making finger assignments. That is, it is not necessary for placement processor 36 to shift its one or more finger placement grids such that at least one grid point from each of the finger placement grids corresponds to a PDP measurement position. In other words, placement processor 36 does not have to align its finger placement grids such that each grid includes a grid point coinciding with a defined point within the searcher delay grid.

Figure 8:
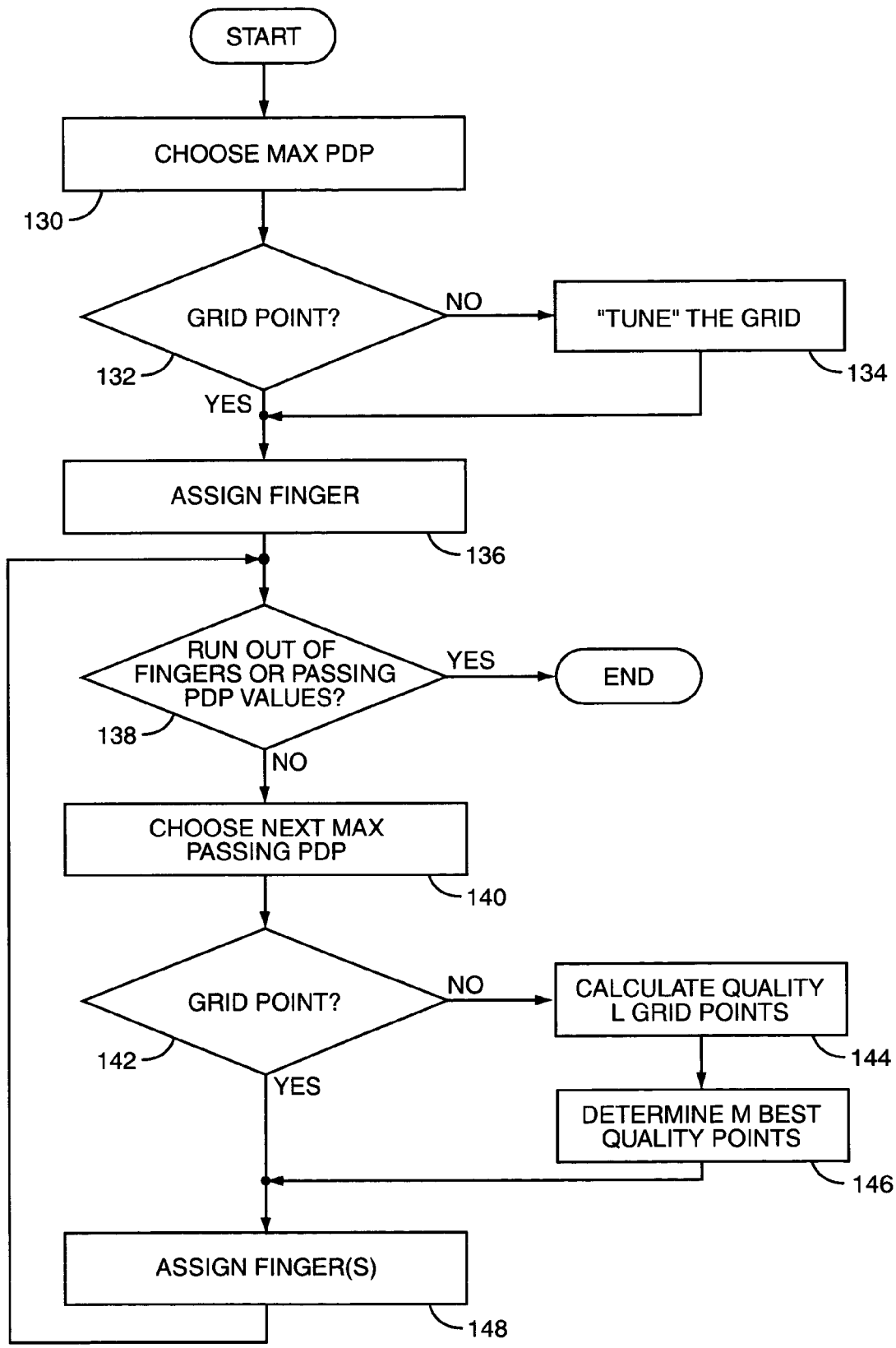
FIG. 8 is a diagram of exemplary logic for another embodiment of the present invention.

In contrast, FIG. 8 illustrates another exemplary embodiment, which may be used alternatively or additionally by the placement processor 36. With this approach, placement processor 36 begins by considering the largest PDP measurement within the multipath delay profile and, if that measurement does not correspond to a delay position matching a grid point within the finger placement grid, the finger placement grid is tuned such that one of its grid positions aligns with that maximum measurement value. In this sense, "tuning" may be thought of as sliding or otherwise shifting a finger placement grid within the search window such that, for example, the finger placement grid point lying closest to the maximum PDP measurement value is shifted forward or backward in delay time to coincide with that value. Of course, given that the finger placement grid has a fixed, uniform grid spacing, it follows that the other grid points within the tuned finger placement grid each are moved a like amount forward or backward in delay time. Alternatively, tuning can be viewed as simply placing the grid such that one grid point aligns with a maximum measurement value.

FIG. 8 illustrates an exemplary implementation of this logic, wherein processing begins with the placement processor 36 choosing or otherwise identifying the maximum PDP measurement value (Step 130) and determining whether or not one of its finger placement grid points corresponds with this maximum measurement value (Step 132). If not, placement processor 36 tunes the finger placement grid (Step 134) and assigns a RAKE finger 30 to the grid position that now overlays the maximum PDP measurement value (Step 136). Placement processor 36 then determines whether it has additional available RAKE fingers 30 and whether it has additional passing PDP measurement values (Step 138). If no additional RAKE fingers 30 are available for assignment, or there are no additional passing PDP measurements, processing ends, but otherwise the placement processor 36 chooses the next maximum passing PDP measurement value (Step 140).

If this next maximum measurement value corresponds to a grid point within the tuned finger placement grid (Step 142) it assigns a RAKE finger 30 to that point and may make additional finger assignments to the next closest grid points (Step 148). Afterward, processing may continue with a determination as to whether there are any remaining RAKE fingers 30 or additional passing PDP values as before (Step 138).

However, if the next greatest passing PDP value does not correspond to a grid point in the tuned finger placement grid (Step 142), placement processor 36 may adopt the previously illustrated logic of FIG. 7, wherein it calculates the quality of the L closest grid points (Step 144) and makes one or more finger placement assignments based on determining the M best quality points from among that set of L grid points (Steps 146 and 148).

In yet another exemplary embodiment of the finger placement method, placement processor 36 selects finger placement grid points for RAKE finger assignments based on considering energy clusters within the multipath delay profile. With a PDP-based multipath delay profile, a "cluster" may be defined as a region comprising PDP measurements above a defined measurement threshold and delimited by regions of measurements below that threshold, wherein the delimiting region spans at least "K" chip periods. (Here, K is a number that is nominally one or greater but in some instances may be less than one.)

In any case, once placement processor 36 identifies the suitable energy clusters within the multipath delay profile, it may rank them by considering a cluster quality that it determines for each identified cluster. Thus, placement processor 36 may start by considering the best quality cluster for use in RAKE finger assignments, and then by proceeding on with other lesser quality clusters until all, or the desired number of, fingers 30 are assigned or there are no more clusters. One or more exemplary representations of cluster quality are defined later herein.

Figure 9:
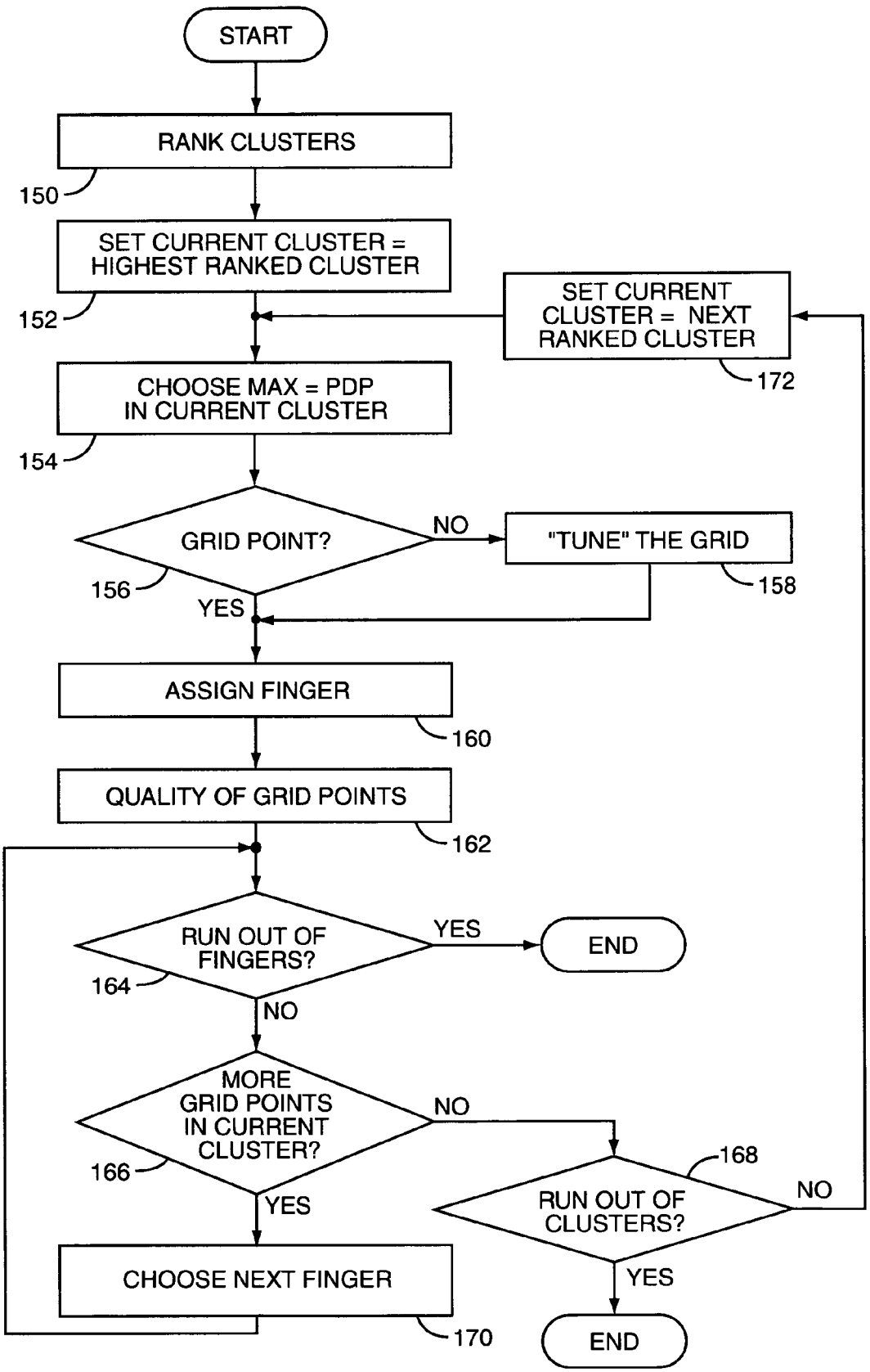
FIG. 9 is a diagram of exemplary logic for another embodiment of the present invention.

FIG. 9 illustrates an exemplary implementation of the above logic, wherein processing begins with the identification and ranking of clusters within the multipath delay profile by placement processor 36 (Step 150). Placement processor 36 then identifies the highest ranked cluster and sets it as the current cluster (Step 152), and then chooses the max PDP measurement lying within this highest ranked cluster (Step 154). If this maximum PDP measurement does not correspond to a grid point within the finger placement grid (Step 156), placement processor 36 tunes the finger placement grid such that one of its grid points does coincide with this maximum measurement value (Step 158), and assigns a RAKE finger 30 to that grid point (Step 160).

Placement processor 36 may then determine the quality of any other grid points whose positions lie within the cluster (Step 162) and make additional finger placement assignments to those grid points having an acceptably high point quality if it has not run out of RAKE fingers 30 to assign. Processing ends if there are no fingers 30 available for assignment but, if remaining RAKE fingers 30 are available, processing continues with placement processor 36 determining whether additional grid points of the finger placement grid lie within the current cluster (Step 166). If not, placement processor 36 determines whether any more clusters are available (Step 168). If so, placement processor 36 continues by choosing the next highest ranked cluster (Step 172) and evaluating the maximum PDP measurement in that next highest cluster (Step 154 and so on). If there are more grid points in the current cluster (Step 166) processing continues with placement processor 36 choosing the next RAKE finger 30 (Step 170) for assignment within the current cluster.

Figure 10:
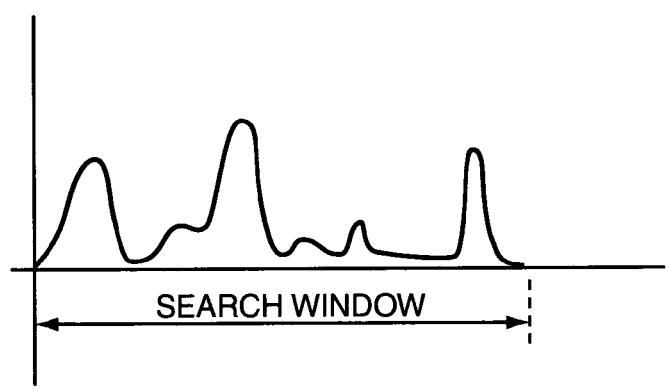
FIG. 10 is a diagram of an exemplary multipath delay profile.
Figure 11:
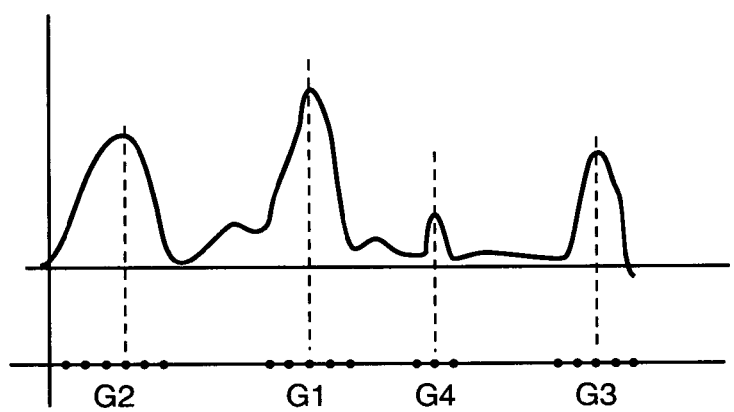
FIG. 11 is a diagram of multiple finger placement grids being tuned with respect to multiple measurement clusters in the multipath delay profile of FIG. 10.

Cluster-based processing opens a number of opportunities with regard to the use of one finger placement grid or multiple finger placement grids, as well as providing several opportunities for how such finger placement grids are tuned relative to the clusters within the multipath delay profile. For example, FIG. 10 illustrates an exemplary multipath delay profile that includes a number of clusters appearing within the search window used by searcher 14. FIG. 11 illustrates an embodiment wherein placement processor 36 uses two or more finger placement grids (here, four grids G1-G4) such that it places one or more fingers 30 on defined grid points within each of the identified clusters.

For example, placement processor 36 may tune grid G1 by aligning a grid point within G1 to correspond to the maximum PDP measurement within the corresponding cluster and may similarly tune grids G2 through G4 to their respective clusters. Note that each of the multiple finger placement grids actually may include points that span the entire search window but it is not necessary for finger placement processor 36 to assign RAKE fingers 30 to each grid point within each of the finger placement grids. Rather, placement processor 36 may assign only one or a few RAKE fingers 30 to grid points within each of the finger placement grids depending on, for example, cluster quality and width. Moreover, the number of fingers 30 assigned within each cluster may be varied, for example, according to the characteristics of that cluster (i.e., width, quality, etc.).

Figure 12:
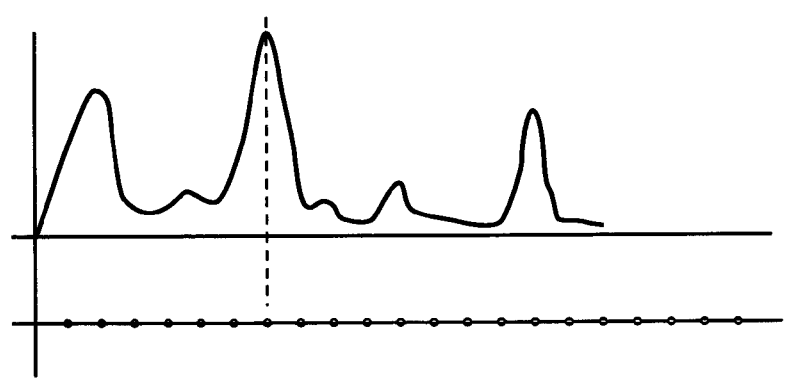
FIG. 12 is a diagram of a single finger placement grid being tuned to one of the multiple measurement clusters in the multipath delay profile of FIG. 10.

In contrast to the multiple finger placement grids used in the illustration of FIG. 11, FIG. 12 illustrates an embodiment where finger placement processor 36 uses a single finger placement grid to span the entire set of clusters identified within the multipath delay profile. Consistent with the earlier described finger placement details, placement processor 36 in this case may tune the single finger placement grid by aligning one of its included grid points with a maximum PDP measurement that is included within the highest ranked cluster, for example.

In yet another variation wherein a single finger placement grid is used to place fingers 30 across multiple clusters within the multipath delay profile, the finger placement grid may not be tuned at all. In that case, for each cluster, finger placement processor 36 may calculate the quality of all grid points in the finger placement grid. Placement processor 36 may perform a "global" ranking of quality points within a common finger placement grid that spans across clusters such that the desired number of RAKE fingers 30 is assigned to grid points having the highest quality rankings.

Other finger placement methods may be used to address "finger-limited" scenarios wherein either the total number of RAKE fingers 30 or the number of currently available RAKE fingers 30 (such as in a G-RAKE implementation of RAKE receiver 12) is significantly limited, placement processor 36 initially may assign or attempt to assign all fingers 30 to one or a few clusters. Some of those assigned fingers 30, particularly those assigned to cluster edges, potentially may be better used if they are "freed" for reassignment to grid points lying in other regions of the multipath delay profile.

Figure 13:
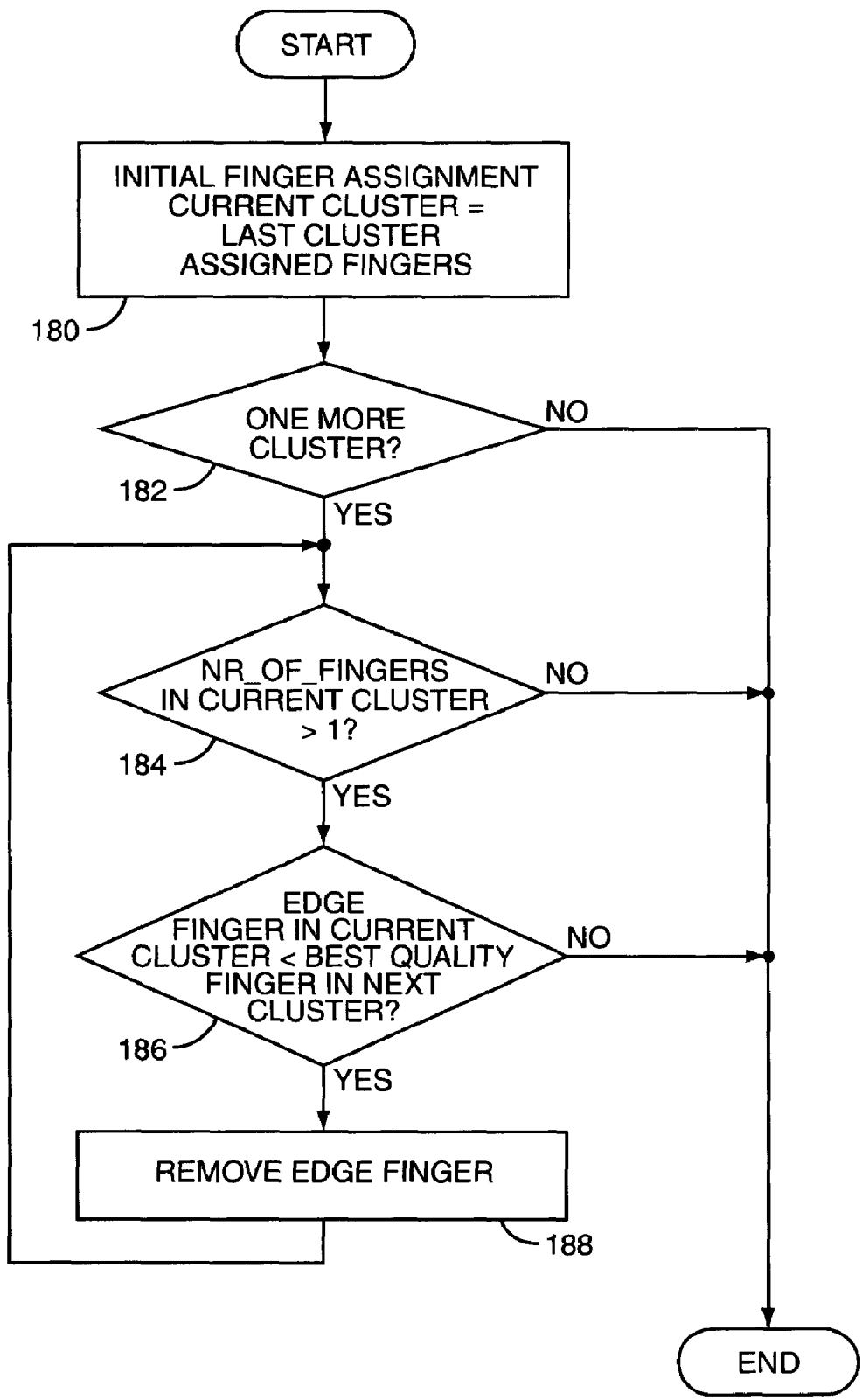
FIG. 13 is a diagram of exemplary logic for another embodiment of the present invention.

FIG. 13 illustrates an exemplary implementation of this embodiment of the finger placement method, wherein processing begins with initial finger placement assignments done according to one of the earlier cluster-based placement methodologies such as those illustrated in FIGS. 9, 11 or 12. Moreover, the methodology assumes that there are at least two clusters each with an assigned number of fingers 30 greater than one and further assumes that there are remaining clusters of energy within the multipath delay profile which have no fingers assigned to them. Thus, the methodology seeks to answer the question as to whether overall performance might be improved by changing some of the finger assignments from their current cluster edges to potentially better positions in other clusters that have no current fingers assigned. The term "edge" may be used to refer to the lowest quality fingers 30 in a cluster, which typically occur on the edge of the cluster.

In an exemplary approach, the placement processor 36 begins with the highest ranked cluster and considers its lowest quality finger assignment. If the point quality of the finger placement grid point corresponding to that edge finger assignment has a lower quality than the best grid point quality in the next highest ranked cluster, then the RAKE finger 30 assigned to that edge grid point is reassigned to the better quality grid point in that next cluster. Continuing with that logic, if it is desirable to free more RAKE fingers 30, placement processor 36 continues comparing grid point qualities in the second and third best ranked clusters, and so on. In general, for the assignment of the "freed" fingers 30, placement processor 36 starts from the lowest ranked cluster with assigned fingers 30 and proceeds to assign freed fingers 30 to the lower ranked clusters as was done in the placement methodology illustrated in FIG. 9 or other cluster assignment method.

FIG. 13 illustrates an exemplary implementation of the above logic wherein processing begins with a determination whether there is at least one additional cluster available in addition to the current cluster (Steps 180 and 182). If not, processing ends because there are no additional clusters in which placement processor 36 might reassign any fingers 30 freed from the current cluster. However, if at least one additional cluster is available, placement processor 36 evaluates whether the number of fingers assigned to the current cluster is greater than one (Step 184). If so, placement processor 36 evaluates the lowest quality finger placement in the current cluster to determine whether a better quality finger placement might be available in the other cluster (Step 186). If a better quality grid point is available in the next cluster, finger placement processor 36 removes RAKE finger 30 from the lower quality grid point in the current cluster (Step 188) thereby freeing it for reassignment.

The process repeats as many times as needed to ensure that RAKE fingers 30 are assigned to the highest quality grid points. More generally, placement processor 36 may consider edge fingers from all previous clusters. Also, processor 36 may repeat the process for the remaining clusters.

Figure 14:
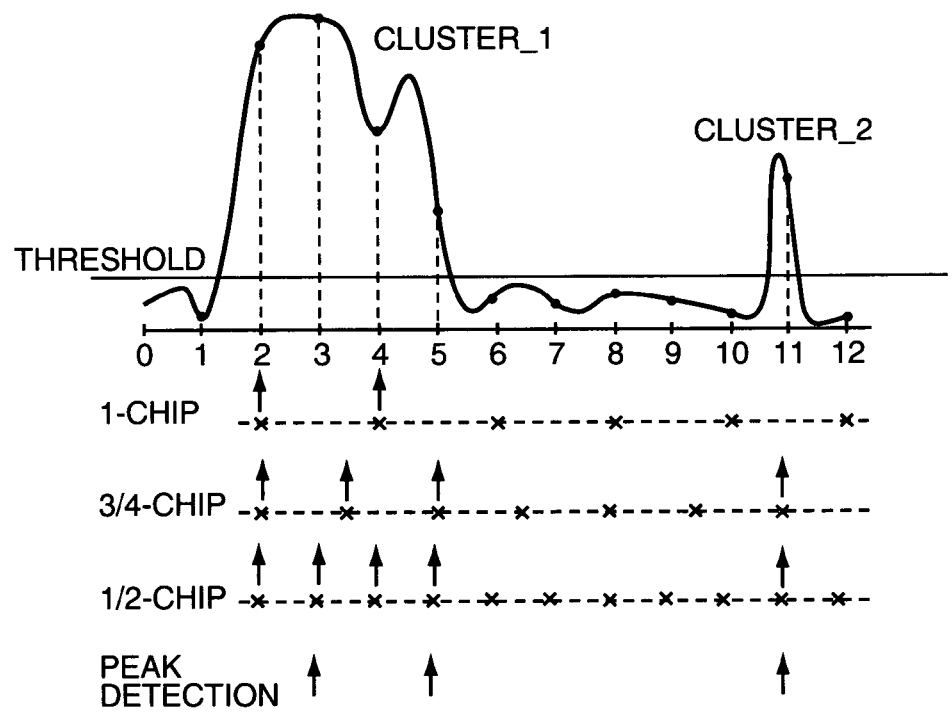
FIG. 14 is a diagram of the relationship between exemplary finger placement strategies, including grid mode and non-grid mode placement strategies.

FIG. 14 illustrates how the present invention can adaptively select from among multiple finger placement strategies, and specifically illustrates a PDP having measurements spaced apart by a half-chip, and including two clusters of energy. Note that the second illustrated cluster includes only one PDP measurement value as indicated by the "dot" positioned along the PDP measurement curve within the graph region identified as "cluster_2". In an exemplary embodiment, placement processor 36 may evaluate strategies using a 1-chip grid, a ½-chip grid, a ¾-chip grid, and using a non-grid peak detection strategy. Assuming that the quality associated with each finger placement grid point is known and that the grid is unique for the entire search window, finger placement processor 36 may begin with a total of four RAKE fingers 30, for example.

Exemplary selection strategy processing thus begins by trying each strategy and forming a metric, such as the sum of the point qualities. From the evaluation of metrics $S_j$, ($j=1, 2, 3, 4$) for the four strategies, the strategy with the best (largest) metric is selected. Note that the strategies could be evaluated for each cluster separately.

Turning, then, to the previously mentioned concepts of point quality and cluster quality, the operating logic of placement processor 36 may determine or otherwise use such qualities in the previously described selection and ranking operations. In defining the quality associated with a finger placement grid point, a first consideration is whether or not it corresponds to a PDP measurement point in the multipath delay profile, i.e., whether it aligns to a point at which the searcher 14 measured the received signal energy. If a finger placement grid point corresponds to a PDP measurement, its quality is equal to the PDP value. If a grid point does not correspond to any PDP measurements, its quality can be calculated in various ways.

One way is to consider the PDP measurements and, by interpolation, find all the missing PDP values that correspond to grid points. Such an approach may be made more efficient by determining values for those regions of the multipath delay profile where the PDP measurement values exceed a defined threshold. Thus, placement processor may threshold the PDP measurement values based on comparing them individually to the defined measurement threshold, which may be a defined energy threshold stored in memory, or may be a calculated value that is updated periodically or as needed during operations of placement processor 36. The illustration depicts an exemplary threshold.

Figure 15:
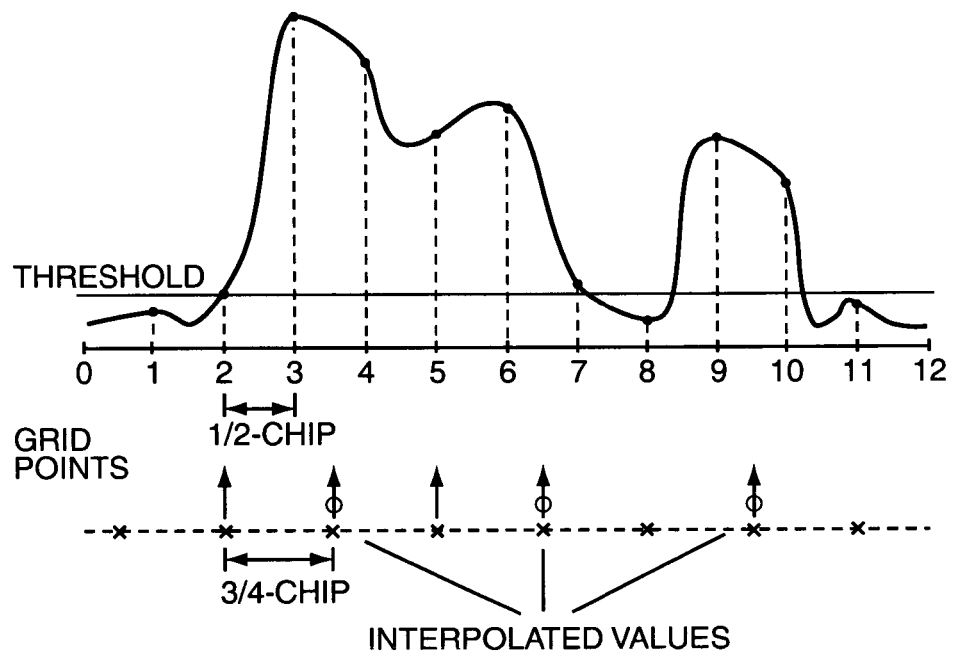
FIG. 15 is a diagram of exemplary interpolation for finger placement grid points lying between measurement points of a multipath delay profile.

Consider as an example the PDP measurement values included in the multipath delay profile curve shown in FIG. 15, where the PDP measurements are ½-chip spaced, and where the finger placement grid is a ¾-chip grid. If a grid point does not correspond to any PDP measurement, its point quality may be determined as follows:

1. If a position (grid point) is in between two PDP measurements that both pass the threshold, it may be assumed that position passes the threshold as well. The quality associated with that position may be calculated, for example, using some form of interpolation. For example, interpolation may comprise averaging the PDP measurements; it also can comprise approximate forms, such as the larger or smaller of two PDP measurements.
2. If a position is next to one PDP measurement that passes the threshold and one that does not, the strategy can depend on:
    2a. the number of fingers 30 combined by the RAKE receiver 12: If there are numerous fingers 30 available, the position can simply be kept and the quality associated with that position set equal to the adjacent PDP value above threshold. Otherwise, linear interpolation can be used to find the quality of that position; or
    2b. the distance between the position and the two adjacent PDP measurement values. If the distance is the same from both measurements, the strategy may be the same as 2a. If the grid position is closer to the PDP measurement above threshold, then the position can be kept and the quality of that position may be set to the PDP value above threshold.

3. If a position is between two measurements that both fail to pass the threshold, it may be assumed that the position does not pass the threshold.

Turning to exemplary cluster quality determination details, the quality of a cluster can be defined based on different criteria. For example, exemplary but non-limiting cluster quality determination methods include (1) setting cluster quality based on the best PDP measurement in the cluster or based on the sum of PDP measurements within the cluster. In general, an exemplary finger placement strategy is based on the maximization of captured signal energy, and that strategy may be used on a cluster basis and, indeed, used across the entire search window.

In an exemplary embodiment, placement processor 36 may sum the PDP values of the finger positions for a given cluster as follows $$S_j = \sum_{i=1}^{n_f(j)} p(\tau_i(j)), \quad (1)$$

where $p(\tau_i(j))$ indicates the PDP sample at position $\tau_i$ for the method j, and $n_f(j)$ is the number of fingers 30 used by method j in the cluster under consideration. From the comparison of $S_j$ values, the method with the highest value of $S_j$ is used.

Of course, as with the point quality evaluation, other energy cluster quality determinations may be made and, indeed, other bases for choosing to which grid positions RAKE fingers 30 actually are assigned may be used as needed or desired.

As shown in FIG. 2, finger placement according to the present invention may be applied when there are multiple receive antennas. In one variation, an exemplary placement method according to the present invention is applied separately to each receive antenna. For example, if there are two receive antennas and 16 RAKE fingers then finger placement can be applied separately to each antenna using 8 fingers for each antenna.

In a second variation, finger placement is applied jointly to the two antenna signals by treating the two antenna signals as one larger signal. For example, if there are PDP measurements on one antenna at delays 0 through 10 and on another antenna at delays 0 through 10, then they can be concatenated into one large PDP with measurements at delays 0 through 20. As delay 11 is really delay 0 on the second antenna, it is desirable to make the PDP measurements for the second antenna to correspond to delays 20 through 30, leaving a gap in delay between the two PDPs.

In a third variation, point and cluster qualities are determined from PDP measurements taken from multiple antennas. For example, a point quality can be determined as the sum of point qualities from different receive antennas. Then the same grid can be used on multiple receive antennas. Though not required, point qualities corresponding to the same or close to the same delay would be summed.

In addition to multiple receive antennas, finger placement according to the present invention also can be applied when there are multiple transmit antennas. One scenario is soft handoff in the downlink. In such soft handoff, a mobile terminal receives transmissions from two or more transmitting antennas that may or may not be co-located. In other scenarios, such as transmit diversity and multiple-input-multiple-output (MIMO) transmission, the transmitting antennas may be co-located.

In one variation of the present invention, finger placement is applied separately to each transmitted signal. This is desirable when the different signals experience substantially different radio channels (propagation paths), as can occur in soft handover when the transmitters are not co-located. In a second variation, finger assignment is applied jointly at the receiver, based on a union of the qualities from the different transmit signals. For example, if one transmitted signal had point qualities 8, 4, and 2, and another transmitted signal had qualities 5, 3, and 1, then fingers would be assigned to the points corresponding to qualities 8, 5, and 4, if there were only three fingers available for such assignment. This approach is desirable where the transmitted signals convey the same underlying information, such as in handover.

In a third variation, the same grid is used for multiple transmitted signals. In this case, point quality can be defined as the sum of qualities obtained from the different transmitted signals. To reduce complexity, these quality values may be computed from only a subset of the available transmitted signals.

Figure 16:
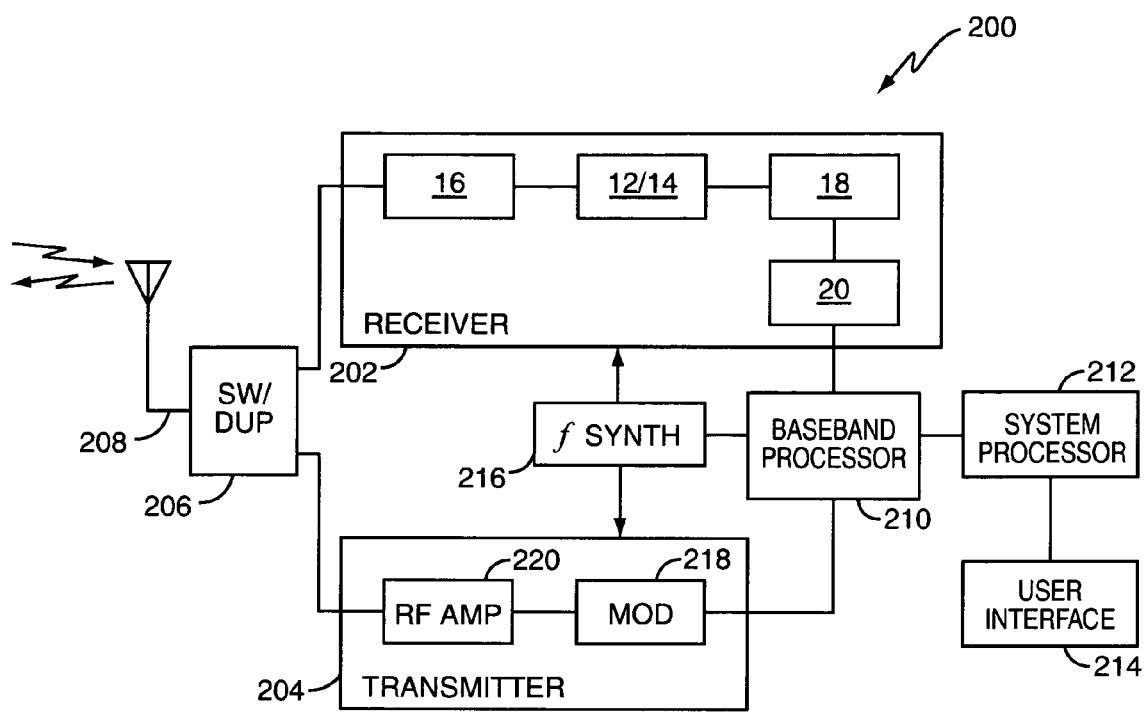
FIG. 16 is a diagram of an exemplary mobile terminal in which the present invention may be embodied.

Those skilled in the art should appreciate that the exemplary receiver 10 comprising RAKE receiver 12 with its inventive finger placement operations, may be put to good use in a wide variety of systems. For example, as illustrated in FIG. 16, such inclusion may be particularly beneficial in a mobile terminal 200 intended for use in a wireless communication system. As used herein, the term "mobile terminal" may include a cellular radiotelephone with or without a multiline display; a Personal Communications System (PCS) terminal that may combine a cellular radiotelephone with data processing, facsimile and data communications capabilities; a PDA that can include a radiotelephone, pager, Internet/Intranet access, Web browser, organizer, calendar and/or a global positioning system (GPS) receiver; and a conventional laptop and/or palmtop receiver or other appliance that includes a radiotelephone transceiver. Mobile terminals also may be referred to as "pervasive computing" devices.

An exemplary mobile terminal 200 includes a receiver 202, a transmitter 204, a switch/duplexer 206 with an associated antenna 208, a baseband processor 210, a system processor 212 and an associated user interface 214, which may include display screens, keypads, audio input and output transducers, etc., and a frequency synthesizer 216. Of particular interest, receiver 202 may include one or more embodiments of the exemplary RAKE receiver 12 as earlier described herein. Indeed, receiver 202 may be implemented similar to receiver 10 of FIG. 1, although elements of it may be implemented within other processing circuits of mobile terminal 200. For example, any or all of RAKE receiver 12, searcher 14, demodulator 18, and signal processor 20 may be implemented as part of baseband processor 210. In such embodiments, front-end 16 would provide filtering, down-conversion and sampling as needed, to provide receiver elements of baseband processor 210 with sampled data streams corresponding to the received signal(s).

Thus, mobile terminal 200 may benefit from any or all of the earlier described finger placement operations associated with assignment of its RAKE fingers 30. That is, mobile terminal 200 may operate with selective grid/non-grid placements, mixed mode (grid and non-grid) placements, or any of the several grid-based placements (single grid, multiple grids, tuned grids, non-tuned grids, etc.).

Figure 17:
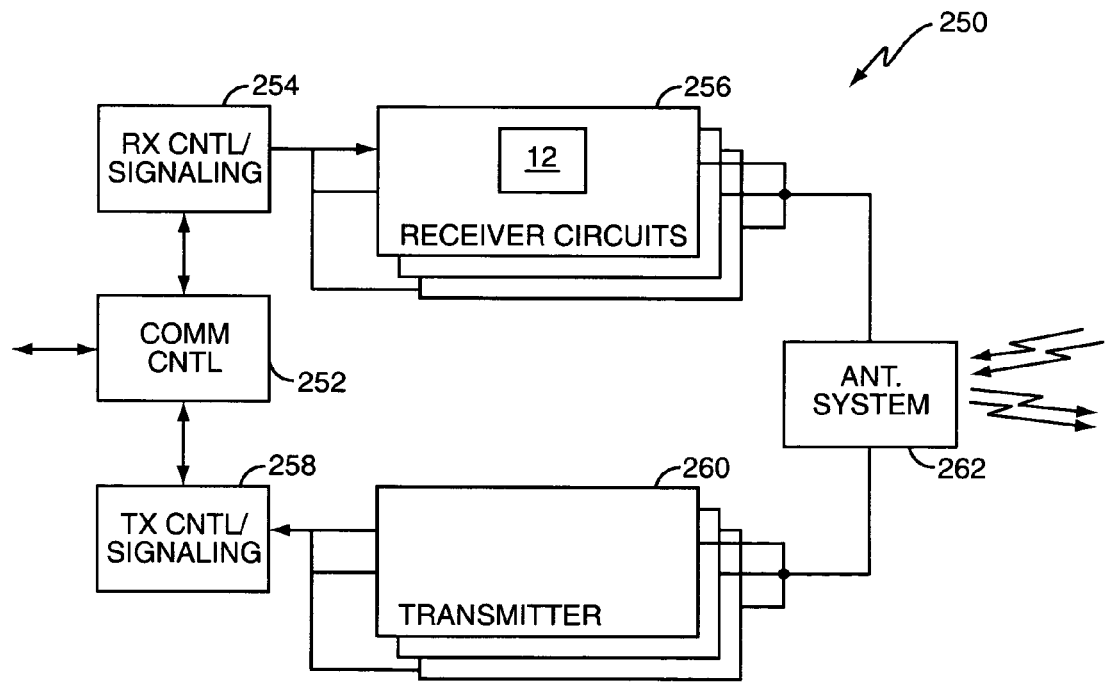
FIG. 17 is a diagram of an exemplary radio base station in which the present invention may be practiced.

Similarly, RAKE receiver 12 may yield operational benefits when applied to other communication network entities such as where it is used in a radio base station (RBS) 250, which also may be referred to as a base transceiver station (BTS). In FIG. 17, an exemplary RBS 250 includes communication control resources 252, receiver control and signaling resources 254, a plurality of receiver circuits 256 comprising a plurality of RAKE receivers 12 and associated receiver circuits, transmitter control and signaling resources 258 and associated transmitter resources 260, along with an antenna system 262 for receiving and transmitting wireless signals to and from mobile terminals 200 or other remote entities.

Given its broad range of applications and the variety of systems in which the present invention may be implemented, those skilled in the art should appreciate that the present invention may be embodied in any number of specific physical implementations. For example, the processing associated with the inventive finger placement method (as described herein) may be supported by dedicated hardware, or implemented in software, or implemented as some combination of the two. More generally, the present invention may be embodied in hardware and/or software (including firmware, resident software, micro-code, etc.). Furthermore, the present invention may take the form of a computer program product on a computer-usable or computer-readable program code embodied in the medium for use by or in connection with an instruction execution system. In the context of this document, a computer-usable or computer-readable medium may be any medium that can contain, store, communicate, propagate, or transport the program for use by or in connection with the instruction execution system, apparatus, or device.

Thus, some or all of RAKE receiver 12 may be implemented in hardware, software, or some combination thereof. In an exemplary embodiment, at least portions of RAKE receiver 12, such as the placement processor 36, may be implemented as an Integrated Circuit (IC). In an exemplary embodiment, then, some or all of RAKE receiver 12 may be implemented as coded program instructions stored in a computer-readable medium, such as FLASH, EPROM, etc., that instruct a processor to carry out the inventive finger placement operations. Such a processor might be a Digital Signal Processor (DSP), a microprocessor or microcontroller, or might be a logic circuit (or circuits) implemented as part of an Application Specific Integrated Circuit (ASIC). Additionally, some or all of RAKE receiver 12 may be implemented as programmable or dedicated logic circuits within a Complex Programmable Logic Device (CPLD), Field Programmable Gate Array (FPGA), or other form of Integrated Circuit (IC). Of course, the foregoing embodiments are exemplary rather than exhaustive.

Additionally, those skilled in the art should recognize that, in general, the foregoing description and the accompanying illustrations represent exemplary embodiments of the present invention and should not be construed as limiting it. Indeed, the present invention is limited only by the following claims and the reasonable equivalents thereof.

What is claimed is:

1. A method of finger placement in a RAKE receiver comprising:
   receiving a composite signal that includes one or more signal images;
   generating a multipath delay profile for the composite signal over a defined search window at a first delay resolution; and
   determining delay assignments for placement of one or more fingers of the RAKE receiver within the search window based on a second delay resolution that is independent of the first delay resolution by determining which grid points in a finger placement grid comprising a plurality of grid points uniformly spaced according to the second delay resolution most closely coincide with one or more strongest measurements in the multipath delay profile.

2. The method of claim 1, further comprising placing at least one finger of the RAKE receiver at a delay assignment that does not correspond to a measurement point in the multipath delay profile.

3. The method of claim 1, wherein generating a multipath delay profile for the composite signal over a defined search window at a first delay resolution comprises generating a sample set of values based on correlation measurements taken at measurement points within the search window, said measurement points being uniformly spaced apart based on the first delay resolution.

4. The method of claim 1, wherein determining which grid points in a finger placement grid comprising a plurality of grid points uniformly spaced according to the second delay resolution most closely coincide with one or more strongest measurements in the multipath delay profile comprises determining grid point qualities for one or more grid points in the finger placement grid and setting placement delays for one or more fingers based on comparing the grid point qualities.

5. The method of claim 1, wherein receiving a composite signal comprises receiving a composite signal on each of two or more receiver antennas.

6. The method of claim 5, wherein generating a multipath delay profile for the composite signal over a defined search window at a first delay resolution comprises generating a multipath delay profile for each composite signal.

7. The method of claim 6, further comprising defining a finger placement grid for each composite signal and determining delay assignments for placement of one or more fingers of the RAKE receiver for each composite signal according to the finger placement grid defined for each composite signal.

8. The method of claim 5, wherein generating a multipath delay profile for the composite signal over a defined search window at a first delay resolution comprises generating a joint multipath delay profile for the two or more composite signals received on the two or more receiver antennas.

9. The method of claim 8, wherein determining delay assignments for placement of one or more fingers of the RAKE receiver within the search window based on a second delay resolution that is independent of the first delay resolution comprises determining delay assignments based on the joint multipath delay profile.

10. The method of claim 5, wherein generating a multipath delay profile for the composite signal over a defined search window at a first delay resolution and determining which grid points in a finger placement grid comprising a plurality of grid points uniformly spaced according to the second delay resolution most closely coincide with one or more strongest measurements in the multipath delay profile comprises:
    generating a multipath delay profile for each composite signal;
    determining a grid point quality for one or more grid points in the finger placement grid based on each multipath delay profile;
    summing the grid point qualities determined for each of the one or more grid points to generate combined grid point qualities; and
    identifying selected grid points of the finger placement grid for assigning fingers of the RAKE receiver based on the combined grid point qualities.

11. The method of claim 10, wherein summing the grid point qualities determined for each of the one or more grid points to generate a combined grid point qualities comprises summing grid point qualities corresponding to substantially the same delay values among the multipath delay profiles.

12. The method of claim 1, wherein receiving a composite signal that includes one or more signal images comprises receiving two or more composite signals, each corresponding to a different transmit antenna.

13. The method of claim 12, wherein generating a multipath delay profile for the composite signal over a defined search window at a first delay resolution comprises generating a multipath delay profile for each composite signal.

14. The method of claim 13, further comprising defining a finger placement grid for each composite signal and determining delay assignments for placement of one or more fingers of the RAKE receiver for each composite signal according to the finger placement grid defined for each composite signal.

15. The method of claim 13, wherein determining which grid points in a finger placement grid comprising a plurality of grid points uniformly spaced according to the second delay resolution most closely coincide with one or more strongest measurements in the multipath delay profile comprises:
defining a common finger placement grid;
determining point qualities of one or more grid points of the finger placement grid for each multipath delay profile; and
identifying one or more selected grid points for assigning fingers of the RAKE receiver based on jointly evaluating the point qualities determined for the multipath delay profiles.

16. The method of claim 13, wherein determining which grid points in a finger placement grid comprising a plurality of grid points uniformly spaced according to the second delay resolution most closely coincide with one or more strongest measurements in the multipath delay profile comprises:
generating a common finger placement grid;
determining a grid point quality for one or more grid points in the finger placement grid based on each multipath delay profile;
summing the grid point qualities determined for each of the one or more grid points to generate combined grid point qualities; and
identifying selected grid points of the finger placement grid for assigning fingers of the RAKE receiver based on the combined grid point qualities.

17. The method of claim 16, wherein summing the grid point qualities determined for each of the one or more grid points to generate combined grid point qualities comprises summing grid point qualities corresponding to substantially the same delay values among the multipath delay profiles.

18. A method of finger placement in a RAKE receiver comprising:
receiving a composite signal that includes one or more signal images;
generating a multipath delay profile for the composite signal based on a searcher delay grid defined within a search window, the searcher delay grid having a searcher grid resolution;
defining a finger placement grid for positioning fingers of the RAKE receiver within the search window, the finger placement grid having a placement grid resolution that differs from the searcher grid resolution and is coarser than a base resolution for the RAKE receiver; and
placing at least one finger of the RAKE receiver on a grid point of the finger placement grid based on evaluating the multipath delay profile.

19. The method of claim 18, wherein generating a multipath delay profile for the composite signal based on a searcher delay grid defined within a search window comprises generating a power/delay profile (PDP) for the composite signal.

20. The method of claim 18, wherein defining a finger placement grid for positioning fingers of the RAKE receiver within the search window comprises defining a set of placement grid points at a delay resolution smaller than the searcher delay grid.

21. The method of claim 18, wherein placing at least one finger of the RAKE receiver on a grid point of the finger placement grid based on evaluating the multipath delay profile comprises placing all of a desired plurality of fingers on grid points of the finger placement grid.

22. The method of claim 18, further comprising placing at least one finger of the RAKE receiver off-grid with respect to the finger placement grid such that the RAKE receiver operates with at least one finger placed on-grid and at least one finger placed off-grid.

23. The method of claim 18, wherein defining a finger placement grid for positioning fingers of the RAKE receiver within the search window comprises defining a plurality of spaced apart delay points within at least a portion of the search window that have a grid resolution based on a Nyquist value associated with the composite signal.

24. The method of claim 23, wherein defining a plurality of spaced apart delay points within at least a portion of the search window that have a grid resolution based on a Nyquist value associated with the composite signal comprises defining sub-chip spaced grid points within the search window.

25. The method of claim 18, wherein defining a finger placement grid for positioning fingers of the RAKE receiver within the search window comprises:
defining at least first and second finger placement grids, each spanning a portion of the search window; and
placing at least a first finger on a grid point within the first finger placement grid and placing at least a second finger on a grid point within the second finger placement grid.

26. The method of claim 25, further comprising:
identifying image clusters in the multipath delay profile; and
spanning at least a portion of a first image cluster with the first finger placement grid and spanning at least a portion of a second image cluster within the second finger placement grid, such that the at least first finger is positioned at a delay time falling within the first image cluster and the at least second finger is positioned at a delay time falling within the second image cluster.

27. The method of claim 26, further comprising aligning a grid point within the first finger placement grid at a desired position relative to the first image cluster, and aligning a grid point within the second finger placement grid at a desired position relative to the second image cluster.

28. The method of claim 18, further comprising operating the RAKE receiver in a mixed placement mode by placing at least one other finger of the RAKE receiver at a delay position that does not correspond to a grid point of the finger placement grid.

29. The method of claim 28, further comprising determining whether to operate in the mixed placement mode based on evaluating the multipath delay profile.

30. The method of claim 18, wherein placing at least one finger of the RAKE receiver on a grid point of the finger placement grid based on evaluating the multipath delay profile comprises:
identifying candidate grid points on the finger placement grid by determining which grid points on the finger placement grid lie closest to measurement peaks within the multipath delay profile that exceed a defined measurement threshold; and assigning one or more fingers to delay values corresponding to one or more of the candidate grid points.

31. The method of claim 18, wherein placing at least one finger of the RAKE receiver on a grid point of the finger placement grid based on evaluating the multipath delay profile comprises:

identifying qualified measurement peaks within the multipath delay profile by comparing the measurement peaks to one or more measurement thresholds;

forming a set of candidate grid points on the finger placement grid by considering those grid points closest to the qualified measurement peaks;

calculating a quality for each candidate grid point; and placing fingers at delay values corresponding to the N best candidate grid points, wherein N denotes a desired number of fingers to be assigned.

32. The method of claim 18, wherein placing at least one finger of the RAKE receiver on a grid point of the finger placement grid based on evaluating the multipath delay profile comprises:

identifying a largest measurement in the multipath delay profile that exceeds a defined measurement threshold;

assigning a finger to a grid point on the finger placement grid that substantially coincides with that largest measurement, if any such grid point exists; and if no grid point on the finger placement grid substantially coincides with the largest measurement, assigning one or more fingers to one or more grid points on the finger placement grid that are closest to the largest measurement.

33. The method of claim 32, wherein assigning one or more fingers to one or more grid points on the finger placement grid that are closest to the largest measurement comprises assigning fingers to the M best grid points of L grid points on the finger placement grid, wherein M can be less than L, and wherein both M and L are numbers equal to or greater than one.

34. The method of claim 18, wherein placing at least one finger of the RAKE receiver on a grid point of the finger placement grid based on evaluating the multipath delay profile comprises:

identifying a maximum measurement in the multipath delay profile;

aligning a grid point of the finger placement grid with the maximum measurement; and placing a finger of the RAKE receiver on the grid point that is aligned with the maximum measurement.

35. The method of claim 18, wherein placing at least one finger of the RAKE receiver on a grid point of the finger placement grid based on evaluating the multipath delay profile comprises:

identifying one or more energy clusters in the multipath delay profile;

ranking the one or more energy clusters according to a cluster quality determined for each of the one or more energy clusters;

defining a first finger placement grid for a highest ranked energy cluster;

aligning a grid position of the first finger placement grid to a maximum measurement within the highest ranked cluster; and assigning a finger of the RAKE receiver to that grid position in the first finger placement grid.

36. The method of claim 35, further comprising:

ranking grid point qualities of remaining grid positions in the first finger placement grid;

assigning remaining fingers of the RAKE receiver to as many remaining grid positions in the first finger placement grid as have a grid point quality above a defined quality threshold; and assigning one or more remaining fingers of the RAKE receiver to a next highest ranked cluster if not all fingers of the RAKE receiver are assigned within the highest ranked cluster.

37. The method of claim 36, wherein assigning one or more remaining fingers of the RAKE receiver to a next highest ranked cluster if not all fingers of the RAKE receiver are assigned within the highest ranked cluster comprises:

defining a second finger placement grid for the next highest ranked cluster;

aligning a grid position of the second finger placement grid to a maximum measurement within the next highest ranked cluster; and assigning a finger of the RAKE receiver to that grid position in the second finger placement grid.

38. The method of claim 18, wherein defining a finger placement grid for positioning fingers of the RAKE receiver within the search window that is independent of the searcher delay and placing at least one finger of the RAKE receiver on a grid point of the finger placement grid based on evaluating the multipath delay profile together comprise:

identifying one or more energy clusters within the multipath delay profile;

ranking the energy clusters based on determining cluster qualities;

tuning a first finger placement grid to a highest ranked energy cluster and assigning one or more fingers of the RAKE receiver to grid positions within that first finger placement grid; and if any fingers remain unassigned, tuning a second finger placement grid to a next highest ranked energy cluster and assigning one or more of the remaining fingers to grid positions within that second finger placement grid.

39. The method of claim 38, further comprising, if any fingers remain unassigned after making assignments to grid positions within the second finger placement grid, tuning a third finger placement grid to a next highest ranked energy cluster and assigning one or more of the remaining fingers to grid positions within that third finger placement grid.

40. The method of claim 38, wherein the first and second finger placement grids have different grid resolutions.

41. The method of claim 18, wherein placing at least one finger of the RAKE receiver on a grid point of the finger placement grid based on evaluating the multipath delay profile comprises:

identifying one or more energy clusters in the multipath delay profile;

aligning the finger placement grid with a highest ranked one of the energy clusters; and assigning one or more fingers of the RAKE receiver to grid positions in the finger placement grid.

42. The method of claim 41, wherein assigning one or more fingers of the RAKE receiver to grid positions in the finger placement grid comprises:

assigning fingers to grid positions within the highest ranked energy cluster with point qualities exceeding a defined quality threshold; and assigning any remaining fingers to grid positions within energy clusters other than the highest ranked energy cluster that exceed the defined quality threshold.

43. The method of claim 18, wherein placing at least one finger of the RAKE receiver on a grid point of the finger placement grid based on evaluating the multipath delay profile comprises:
- identifying two or more energy clusters in the multipath delay profile;
- comparing point qualities of grid points in one or more finger placement grids between the two or more clusters; and
- assigning fingers of the RAKE receiver to the highest quality grid points among the two or more energy clusters.

44. The method of claim 18, wherein placing at least one finger of the RAKE receiver on a grid point of the finger placement grid based on evaluating the multipath delay profile comprises:
- interpolating multipath delay profile values between searcher delay grid points to determine multipath delay profile values corresponding to grid points in the finger placement grid;
- determining grid point qualities for one or more candidate grid points in the finger placement grid based on the multipath delay profile values; and
- placing one or more fingers of the RAKE receiver at candidate grid points based on the grid point qualities.

45. The method of claim 18, wherein receiving a composite signal that includes one or more signal images comprises receiving a first composite signal associated with a first receive antenna, and receiving a second composite signal associated with a second receive antenna, and wherein the steps of generating a multipath delay profile, defining a finger placement grid, and placing at least one finger of the RAKE receiver on a grid point of the finger placement grid are performed for each of the first and second composite signals.

46. A receiver comprising:
- a searcher to generate a multipath delay profile based on a searcher delay grid for a received signal that includes one or more signal images, the searcher delay grid having a searcher grid resolution;
- a RAKE receiver to generate a despread signal by despreading the received signal, the RAKE receiver comprising:
  - a plurality of fingers to despread received signals at different signal delays; and
  - a logic circuit to assign one or more fingers of the RAKE receiver to grid points of one or more finger placement grids based on the multipath delay profile, said one or more finger placement grids each having a placement grid resolution that differs from the searcher grid resolution and is coarser than a base resolution for the RAKE receiver.

47. The receiver of claim 46, wherein the searcher is configured to generate the multipath delay profile as a power/delay profile (PDP) within a search window.

48. The receiver of claim 46, wherein the RAKE receiver is configured to define a finger placement grid comprising a plurality of grid points that span at least a portion of the multipath delay profile but that is independent of measurement points comprising the multipath delay profile.

49. The receiver of claim 46, wherein the RAKE receiver is configured to assign one or more fingers of the RAKE receiver to grid points of one or more finger placement grids based on the multipath delay profile by identifying grid points in the one or more finger placement grids lying closest to signal peaks within the multipath delay profile.

50. The receiver of claim 46, wherein the receiver defines the one or more finger placement grids for positioning fingers of the RAKE receiver within the search window as one or more sets of grid points each comprising at least one grid point that does not correspond to a measurement point in the multipath delay profile.

51. The receiver of claim 46, further comprising a radio front-end to receive a transmitted signal and to provide the received signal as a baseband signal by downconverting the transmitted signal.

52. The receiver of claim 46, further comprising a demodulator to recover transmitted information from the despread received signal output by the RAKE receiver.

53. The receiver of claim 46, wherein the receiver comprises a portion of a wireless communication device.

54. The receiver of claim 46, wherein the logic circuit of the RAKE receiver comprises at least a portion of an Integrated Circuit (IC).

55. The receiver of claim 46, wherein the receiver is configured to:
- interpolate between measurement values in the multipath delay profile to obtain interpolated measurements corresponding to grid points in the one or more finger placement grids;
- determine point qualities for one or more candidate grid points of the one or more finger placement grids based on the interpolated measurements; and
- assign fingers to one or more of the candidate grid points based on the point qualities.

56. The receiver of claim 46, wherein the receiver is configured to operate in a mixed finger placement mode, wherein the receiver places at least one active finger on-grid with respect to the one or more finger placement grids and places at least one active finger off-grid with respect to the one or more finger placement grids.

57. The receiver of claim 56, wherein the receiver is configured to selectively operate in the mixed finger placement mode based on evaluating the multipath delay profile.

58. The receiver of claim 46, wherein the receiver is configured to:
- identify energy clusters in the multipath delay profile; and
- align at least a first finger placement grid based on a first selected energy cluster.

59. The receiver of claim 58, wherein the receiver is configured to:
- position the first finger placement grid based on the first selected energy cluster;
- extend the grid positions of the first finger placement grid to cover one or more other clusters; and
- assign fingers to grid positions corresponding to the first selected cluster and, optionally, to the one or more other clusters.

60. The receiver of claim 58, wherein the receiver is configured to:
- align one or more additional finger placement grids with respective ones of one or more other selected energy clusters;
- position the one or more additional finger placement grids based on the one or more other selected energy clusters; and
- assign fingers to grid positions in any one or all of the first finger placement grid and the one or more additional finger placement grids.

61. The receiver of claim 46, wherein the receiver is configured to:
- define at least first and second finger placement grids, each spanning a portion of a search window; and
- placing at least a first finger on a grid point within the first finger placement grid and placing at least a second finger on a grid point within the second finger placement grid.

62. The receiver of claim 61, wherein the receiver is configured to:
  identify image clusters in the multipath delay profile; and
  span at least a portion of a first image cluster with the first finger placement grid and span at least a portion of a second image cluster within the second finger placement grid, such that the at least first finger is positioned at a delay time falling within the first image cluster and the at least second finger is positioned at a delay time falling within the second image cluster.

63. The receiver of claim 62, wherein the receiver is configured to align a grid point within the first finger placement grid at a desired position relative to the first image cluster, and align a grid point within the second finger placement grid at a desired position relative to the second image cluster.

64. The receiver of claim 46, wherein the logic circuit comprises a processor circuit.

65. The receiver of claim 46, wherein the RAKE receiver comprises a Generalized RAKE (G-RAKE) receiver.

66. The receiver of claim 46, wherein the receiver is configured to:
  determine a point quality for one or more grid points in a finger placement grid based on the multipath delay profile; and
  assign fingers of the RAKE receiver to grid points in the finger placement grid based on the determined point qualities.

67. The receiver of claim 46, wherein the receiver is configured to:
  identify candidate grid points in a finger placement grid based on thresholding a measurement value obtained from the multipath delay profile for one or more grid points;
  determine point qualities for the candidate grid points; and
  assigning fingers to one or more of the candidate grid points based on ranking the determined point qualities.

68. The receiver of claim 46, wherein the receiver is configured to place at least one finger of the RAKE receiver on a grid point of a finger placement grid based on interpolating multipath delay profile values between searcher delay grid points to determine multipath delay profile values corresponding to grid points in the finger placement grid.

69. The receiver of claim 46, wherein the receiver includes first and second receive antennas, and wherein the receiver is configured to assign one or more fingers to a first received signal associated with the first receive antenna and to assign one or more fingers to a second received signal associated with the second receive antenna such that the receiver uses at least one first finger placement grid for the first antenna and at least one second finger placement grid for the second antenna.

70. A computer-readable medium encoded with program instructions to instruct a processor for a RAKE receiver to:
  evaluate a multipath delay profile comprising a plurality of measurement values for a received signal taken at corresponding measurement points on a searcher delay grid having a searcher grid resolution;
  define a finger placement grid comprising a plurality of grid points that span at least a portion of the multipath delay profile the finger placement grid having a placement grid resolution that differs from the searcher grid resolution and is coarser than a base resolution for the RAKE receiver; and
  determine delay assignments for one or more fingers of a RAKE receiver corresponding to one or more selected grid points of the finger placement grid based on evaluating the multipath delay profile.

71. The computer-readable medium of claim 70, further comprising instructions to instruct the processor to tune the finger placement grid by aligning at least one grid point of the finger placement grid with at least one measurement point of the multipath delay profile.

72. The computer-readable medium of claim 70, further comprising instructions to instruct the processor to define two or more finger placement grids and to select at least one grid point from each of the two or more finger placement grids for determining the corresponding delay assignments of two or more fingers of the RAKE receiver.

73. The computer-readable medium of claim 70, further comprising instructions to instruct the processor to define at least one additional finger placement grid, such that the processor uses at least first and second finger placement grids in determining delay assignments.

74. The computer-readable medium of claim 73, further comprising instructions to instruct the processor to tune the first finger placement grid to a first measurement point in the multipath delay profile, and to tune the second finger placement grid to a second measurement point in the multipath delay profile.

75. The computer-readable medium of claim 70, wherein instructions to determine delay assignments for one or more fingers of a RAKE receiver corresponding to one or more selected grid points of the finger placement grid based on evaluating the multipath delay profile comprise instructions to:
  determine a grid point quality for each of two or more grid points in the finger placement grid; and
  select one or more grid points for assigning a finger placement to one or more fingers of the RAKE receiver based on comparing the grid point qualities.

76. A mobile terminal comprising:
  a transmitter to transmit wireless signals; and
  a receiver to receive wireless signals, said receiver comprising a RAKE receiver configured to:
    generate a finger placement grid that is independent of a searcher grid used to generate a multipath delay profile for a received signal;
    evaluate one or more grid points of the finger placement grid based on the multipath delay profile to identify one or more selected grid points of the finger placement grid; and
    assign delay settings of one or more fingers of the RAKE receiver corresponding to the one or more selected grid points.

77. The mobile terminal of claim 76, wherein the receiver is configured to generate the finger placement grid as a plurality of uniformly spaced delay positions that span at least a portion of the multipath delay profile.

78. The mobile terminal of claim 77, wherein the receiver is configured to generate two or more finger placement grids and to assign delay settings to two or more RAKE fingers corresponding to selected grid points in two or more of the finger placement grids.

79. The mobile terminal of claim 76, wherein the receiver is configured to evaluate one or more grid points of the finger placement grid based on the multipath delay profile to identify one or more selected grid points of the finger placement grid by determining which grid points lie closest to one or more measurement peaks in the multipath delay profile.

80. The mobile terminal of claim 76, wherein the receiver is configured to generate interpolated measurement values corresponding to grid points lying between measurement points of the multipath delay profile, and to compare one or more interpolated values to determine grid point qualities for those grid points, said grid point qualities being used to identify the selected grid points of the finger placement grid.

81. The mobile terminal of claim 80, wherein the receiver is configured to determine a grid point quality for any grid points that align with measurement points in the multipath delay profile directly based on the measurement values in the multipath delay profile that correspond to those grid points.

82. The mobile terminal of claim 76, wherein the receiver is configured to operate in a mixed placement mode wherein at least one finger is assigned to a grid point of the finger placement grid and at least one finger is assigned to a delay position that does not correspond to a grid point in the finger placement grid.

83. The mobile terminal of claim 76, wherein the receiver is configured to operate in a non-grid mode on a selective basis, and wherein the finger placement grid is not used to place fingers in the non-grid mode, and further wherein the receiver is configured to select the non-grid mode based on evaluating the multipath delay profile.

84. A base station comprising:
a transmitter to transmit wireless signals; and
a receiver to receive wireless signals, said receiver comprising a RAKE receiver configured to:
define a finger placement grid for placement of one or more fingers of the RAKE receiver that is independent of a searcher grid used to generate a multipath delay profile for a received signal, the searcher grid having a searcher grid resolution and the finger placement grid having a placement grid resolution that differs from the searcher grid resolution and is coarser than a base resolution for the RAKE receiver;
identify one or more selected grid points by evaluating grid points of the finger placement grid based on the multipath delay profile; and
assign delay settings corresponding to the selected grid points to one or more of the fingers of the RAKE receiver.

85. The base station of claim 84, wherein the receiver is configured to define the finger placement grid as a plurality of uniformly spaced delay positions that span at least a portion of the multipath delay profile.

86. The base station of claim 85, wherein the receiver is configured to define two or more finger placement grids and to assign delay settings to two or more RAKE fingers corresponding to selected grid points in two or more finger placement grids.

87. The base station of claim 84, wherein the receiver is configured to identify one or more selected grid points grid by evaluating grid points of the finger placement grid based on the multipath delay profile by determining which grid points of the finger placement grid lie closest to one or more measurement peaks in the multipath delay profile.

88. The base station of claim 84, wherein the receiver is configured to generate interpolated multipath delay profile measurement values corresponding to grids points of the finger placement grid lying between measurement points of the multipath delay profile, and to compare one or more interpolated values to determine grid point qualities for those grid points, said grid point qualities being used to identify the selected grid points.

89. The base station of claim 88, wherein the receiver is configured to determine a grid point quality for any grid points that align with measurement points in the multipath delay profile directly based on the measurement values in the multipath delay profile that correspond to those grid points.

90. The base station of claim 84, wherein the receiver is configured to operate in a mixed placement mode wherein at least one finger is assigned to a grid point of the finger placement grid and at least one finger is assigned to a delay position that does not correspond to a grid point in the finger placement grid.

91. The base station of claim 84, wherein the receiver is configured to operate in a non-grid mode on a selective basis, and wherein the finger placement grid is not used to place fingers in the non-grid mode, and further wherein the receiver is configured to select the non-grid mode based on evaluating the multipath delay profile.

* * * * *

UNITED STATES PATENT AND TRADEMARK OFFICE
CERTIFICATE OF CORRECTION

PATENT NO.         : 7,469,024 B2
APPLICATION NO.    : 10/653679
DATED              : December 23, 2008
INVENTOR(S)        : Khayrallah et al.

It is certified that error appears in the above-identified patent and that said Letters Patent is hereby corrected as shown below:

In Column 22, Line 40, in Claim 76, delete "signal;" and insert -- signal, the searcher grid having a searcher grid resolution and the finger placement grid having a placement grid resolution that differs from the searcher grid resolution and is coarser than a base resolution for the RAKE receiver; --, therefor.

Signed and Sealed this

Twenty-seventh Day of October, 2009

David J. Kappos
*Director of the United States Patent and Trademark Office*